United States Patent [19]

McCutchen

[11] Patent Number: 5,023,725

[45] Date of Patent: Jun. 11, 1991

[54] METHOD AND APPARATUS FOR DODECAHEDRAL IMAGING SYSTEM

[76] Inventor: David McCutchen, 931 N. Gardner St., W. Hollywood, Calif. 90046

[21] Appl. No.: 425,406

[22] Filed: Oct. 23, 1989

[51] Int. Cl.$^5$ .................... H04N 5/74; H04N 7/00; H04N 9/31; H04N 7/18

[52] U.S. Cl. .................................. 358/231; 358/87; 358/60; 358/93; 350/502; 352/70; 354/94

[58] Field of Search .................. 358/60, 231, 87, 50, 358/93, 104; 350/502, 124, 125; 352/69, 70; 354/103, 110, 113, 119, 94; 353/30, 28

[56] References Cited

U.S. PATENT DOCUMENTS

| | | | |
|---|---|---|---|
| 3,209,073 | 9/1965 | Falbel | 358/87 |
| 3,687,530 | 8/1972 | Watanuki | 352/71 |
| 3,698,803 | 10/1972 | Watanuki | 352/69 |
| 3,832,565 | 8/1974 | Graf | 250/566 |
| 4,100,571 | 7/1978 | Dykes | 358/87 |
| 4,214,821 | 7/1980 | Termes | 352/70 |
| 4,656,506 | 4/1987 | Ritchey | 358/60 |
| 4,673,057 | 6/1987 | Glassco | 181/144 |
| 4,772,942 | 9/1988 | Tuck | 358/87 |
| 4,796,961 | 1/1989 | Yamada et al. | 350/6.8 |
| 4,798,448 | 1/1989 | Van Raalte | 350/345 |

OTHER PUBLICATIONS

Daily Variety: "Single-Camera, 360-Film . . . ", 12/26/89, p. 3.
Sidney Ray: "The Lens and All Its Jobs", 1977, 64-69, 74-7, 98-103.
Cox: "Photographic Optics", 1974, pp. 485-497, 514-533.
Video (Magazine): Sep. '89 Issue—See Woodcock, p. 18, Slovick, pp. 64-68, Forbis, pp. 70-73.
Panasonic (Brochures) on WU-CD2, GP-12 Cameras and Lenses.
Sony (brochure) on XC-711 and XC-007 CCD Cameras.
Computer Pictures Magazine, 9/89, p. 56 ad for Nikon Hr-1500c.
Re:Facts (brochure) on Relay Single Fiber HD Transmission System.
SMPTE Journal, 9/89, "Transmission of HDTV . . . " Natarajan et al., 651-657.
Laser Creations (brochure) on LVP Laser Video Projector, 9/21/89.
Hitachi (brochure) on C70-2010R Multiscan HD Projector.
Thorn EMI (brochure) on CID Projection Lamp.
Pugh, "Polyhedra, A Visual Approach", 1976, pp. 7-10, 12, 14, 26, 57-60, 84-102.
Wenninger, "Spherical Models", 1979, pp. 9-21, 26-33, 37, 41, 126-131, 43-53, 58-61, 65-66.
Dana's Textbook of Mineralogy, 1946 ed. pp. 70-71, 74-85.
Photographic Stills (3) from "Flat Out" by David McCutchen.

*Primary Examiner*—John K. Peng

[57] ABSTRACT

A dodecahedral environmental photography and projection system based on a pentagonal format is disclosed, designed for a modular compound camera and projector system aligned according to the dodecahedron, for the photography and projection of apparently continuous images across the interior surface of a dome or spherical theater. The use of a compound system provides better resolution that a single-camera system, and the use of a pentagonal picture as a standard shape allows complete coverage of a spherical surface, and greater use of the available lens image than existing rectangular formats. By the addition of camera and projection modules, this system enables photography and projection up to a total spherical field of view, and practical application of video technology to a dome theater. A masking processor is also provided to control the shape of the projected video image, enabling projection of compound images of variable overall shape and size. An electro-optical lens is also described, sufficient to produce the effect of a lens with two or three optical centers, so that one lens can cover more than one view. With a dual-center lens, the number of camera modules required is thereby halved, or if the number of camera modules remains the same and their dual views are made to overlap, the effective resolution of the system is thereby doubled.

34 Claims, 18 Drawing Sheets

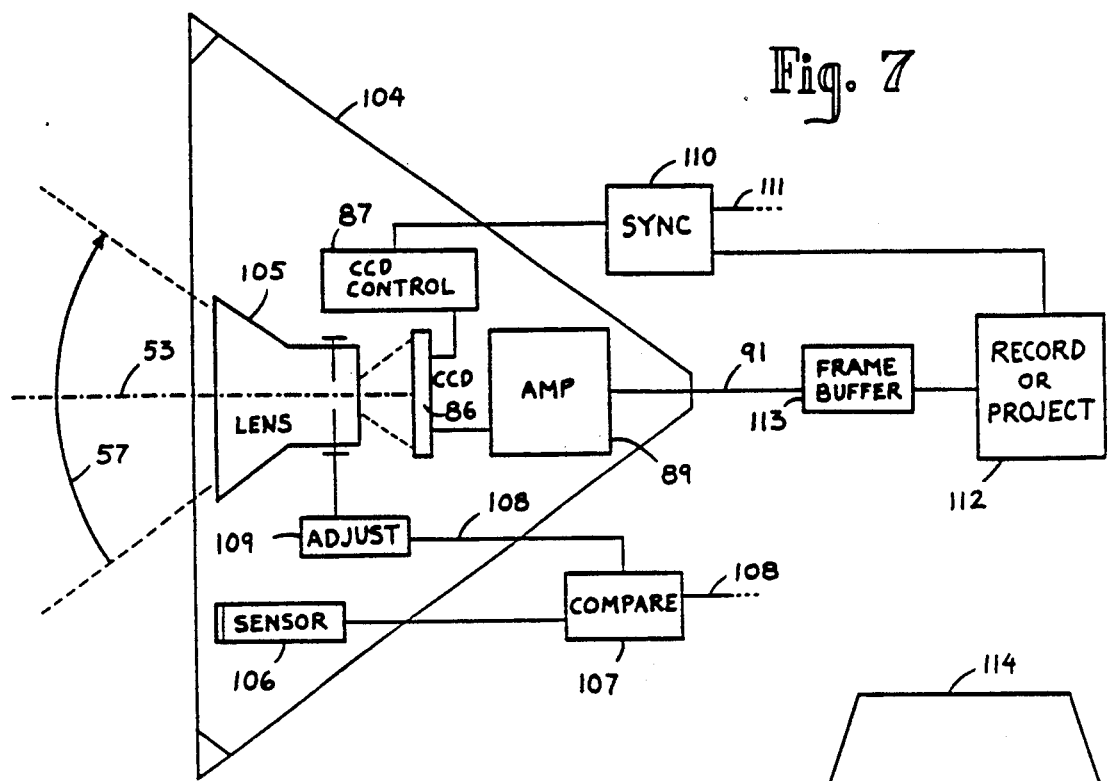
Fig. 7
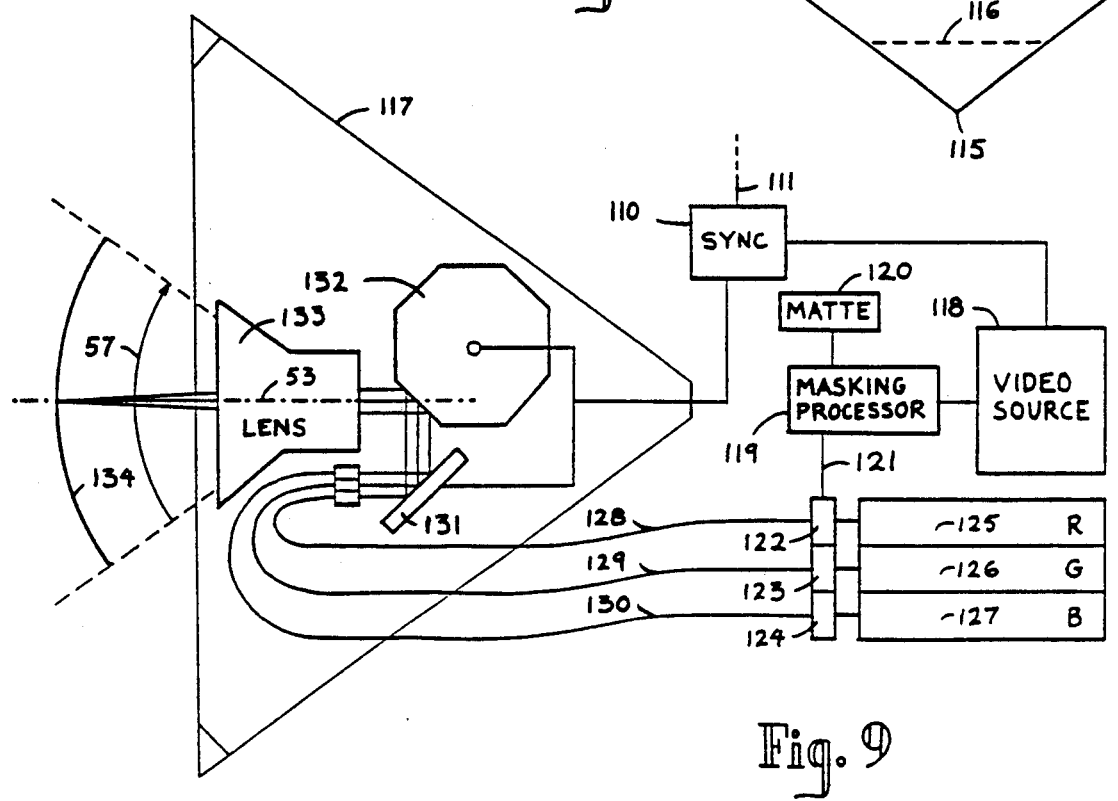
Fig. 8
Fig. 9

METHOD AND APPARATUS FOR DODECAHEDRAL IMAGING SYSTEM

BACKGROUND - FIELD OF THE INVENTION

This invention generally relates to an image reproduction system involving a matched compound camera and compound projector design, and in particular to the geometric arangement of the elements of both the camera system and the projection system according to the twelve-sided dodecahedron that enable the projection of apparently continuous images across the interior of a dome or spherical theater. It is also related to panoramic television camera and projection systems.

DESCRIPTION OF THE PRIOR ART

Planetariums regularly present the awe-inspiring illusion of placing the audience in an entirely new environment, namely outdoors on a starry night, with the sky filling the entire curved field of view. Laser shows such as Laser Images Inc.'s Laserium also make use of these dome theaters to present colored designs encompassing the viewer. But these dome theater shows do not include motion pictures covering the curved interior surface, because of the lack of an effective means of photographing and projecting, with high resolution and minimum distortion, a continuous picture over such an extremely wide field of view, thereby photographing and projecting an entire environment.

The optimum image produced by a normal photographic lens is circular in shape, because increased distortion and loss of resolution is typically a function of the distance from its optical center. This lens image is usually cropped to a rectangular shape, out of a tradition perhaps derived from the shape of paintings, drawings and the theatrical stage. However, much of the usable lens image area is thereby wasted. A rectangular picture with an aspect ratio of 1:1.85, commonly used for theatrical motion pictures, can only encompass 53% of this circular area. Wide-screen film formats such as Cinemascope, Vistavision and Panavision, with aspect ratios as wide as 1:2.2, use even less of this optimum image area. Therefore the farther away an aspect ratio is from a circle, the worse the average quality of the picture will be.

To present a large picture filling more of the audience's field of view, while maintaining an acceptable level of resolution, larger film sizes and formats such as 70 mm and IMAX film have been introduced. But the theatrical films shot using this film have been made for presentation on flat screens, unsuitable for a dome theater, because when photography made for a flat screen is shown on a curved surface such as a dome, unpleasant distortion of the picture results. For creating the illusion of a continuous picture filling the interior of a hemisphere, special photography is needed to make a picture appropriate for such a screen.

For an image covering an entire hemisphere, photography through a fisheye lens can be done, then projected back through the same type of lens onto a dome-shaped screen, using practically the entire circular lens image. A system such as this for an inflatable dome was developed in the early 1970's for Hitachi. Another, partial example of this is the OMNIMAX system by Imax Systems Corp. of Toronto, Canada, which, like IMAX, uses a horizontal 70 mm film image fifteen perfs wide to project an elliptical image, 180 degrees wide, 100 degrees above the horizon and 20 below. But the edges of the frame are still visible, and thus create the effect of a movie projection, rather than an actual environment. The extremely distored image produced by fisheye photography is hard to decipher unless projected, and because this amount of barrel distortion is not compatible with regular motion picture and television photography, any additions or modifications to the image, such as titling or special effects, are difficult to accomplish. Also, because a single image must be stretched during projection over so large a surface, brightness and resolution typically suffer, especially at the periphery. Because of the size of the film and the mechanical transport apparatus it requires, the camera also tends to be very bulky and heavy.

Two annular photography and projection systems which use a single camera to produce ring-shaped pictures to cover the horizon are described in U.S. Pat. No. 3,209,073, which describes panoramic television photography using a spiral scanning system, and in U.S. Pat. No. 4,100,571, which describes a laser imaging system used in a flight simulator.

However, these are for views around the horizon only, and ignore the space above and below the viewer. Both also employ low-resolution scanning and projection methods that would yield images of low overall quality.

Panoramic film cameras have also been developed to scan a wide field of view with a high degree of resolution, usually by rotating the camera relative to a curved film plane so as to sequentially expose a panorama onto the film through a narrow moving slit. This yields images of high quality. However, these views are generally around the horizon, ignoring the area above and below the viewer, and require a drum-shaped projection surface matching the cylindical plane of the film image. The amount of mechanical movement involved in each exposure makes photography of a motion picture very difficult, the amount of film involved makes the system cumbersome, and the extremely wide aspect ratio of the film image makes it unsuitable for projection using standard projection lenses.

To provide better resolution and brightness, while working with recognizable individual images, multiple-picture systems have been developed to cover a wide field of view. The use of multiple pictures also allows the option of using either different images on the various screens, or a continuous panoramic scene. These multiple-picture systems usually involve several rectangular screens arranged in a horizontal sequence. Examples include Cinerama, with three screens, and Circlevision, with nine screens forming a complete circle around the viewer. However, this horizontal sequence of screens typically leaves the area above the viewer empty, and lens distortion and mechanical wiggle at the edges of each rectangular picture too often make the boundaries between one screen and another obvious.

To cover an entire hemispherical field of view, a compound camera must include several cameras, all facing outward. The weight, size, and unsteady picture of typical motion picture film cameras makes them unsuitable for use in such a system. The compound motion picture camera described in U.S. Pat. No. 3,698,803 shows how cumbersome such a camera would be.

Television cameras, on the other hand, produce a steady picture, and they have become small enough to be bundled together due to the development of Charge Coupled Device (CCD) technology and fiber optic outputs. Wide-view photography and projection using horizontal rows of rectangular television pictures has been developed for military and surveillance uses, such as U.S. Pat. No. 4,772,942, which covers a four-camera binocular display system for tanks. However, this system depends on elaborate pre-distortion of the image for the display system, because the cameras photograph parts of a curved field of view from the inside of the curve looking out, but the pictures are displayed from the outside of the curve looking in.

What is needed is the projection of the camera image from the center of a sphere outward, matching the orientation of the camera relative to the surrounding spherical field of view. Projection of television pictures onto wide screens with brightness approaching motion picture film projection has been aided by the development of laser video projection systems, such as is described in U.S. Pat. No. 4,796,961, and active phosphor screens responding to polarized light beams, such as described in U.S. Pat. No. 4,798,448. But because a spherical surface cannot be divided entirely into rectangles, reshaping or cropping of the picture for projection must be done in order to create a mosaic which will cover a hemisphere. One such method of cropping is described in U.S. Pat. No. 3,687,530, with five projectors projecting triangular sections from around the periphery of a dome. However, the use of a triangle as a standard shape means that less than 41% of the available lens image could be used.

The optimum cropping would produce a small number of pictures of uniform shape which could then be used to cover an entire spherical surface. Regular or Platonic polyhedrons are the only geometrical figures which have this characteristic of equal facets. There are only five: the tetrahedron, the hexahedron or cube, the octahedron, the icosahedron and the dodecahedron, a twelve-sided figure made of pentagons. Environmental photography based on regular polyhedrons is described in U.S. Pat. No. 4,214,821, where separate still photographs are exposed using a polyhedral camera mount, and the prints bonded together to form a polyhedron body. However, this applies only to the mounting of prints produced by still photography, viewed as flat facets from outside, and does not pertain to simultaneous photography of a moving picture image and its projection and viewing on the interior of a spherical screen.

Existing photographic lenses produce an image with only one optical center. This does not allow more than one picture for a compound camera or projection system to be extracted from the image produced by a single lens.

Existing individual projectors, whether for film or for video, are based on a static aspect ratio or "hard matte" for cropping the camera or projector image. This does not allow flexibility in the shape of the projected picture, or allow a compound projection system where whole or partial images add up to a variety of overall image shapes and sizes.

Thus it will be seen that the prior art has several disadvantages, including:

(a) Single-camera systems are limited to the resolution of that individual camera, (b) A rectangular aspect ratio for photography is unsuitable for even division of a spherical surface, and wasteful of the available lens image.

(c) Current cameras are not shaped to fit together in a modular fashion so that the edges of their respective pictures are automatically aligned.

(d) Compound film cameras are bulky and heavy, are limited in recording time, and because light from the lens has to directly impact the film recording medium, must be self contained. Also, mechanical movement makes the image wiggle, and the film recording medium itself cannot be stretched or altered in shape.

(e) Hard, physical mattes acting as barriers to light in existing film camera mean that the camera or projector image shape cannot be altered with controlled fluidity.

(f) Existing lenses have only one optical axis, because of the constraints of spherical lens manufacture.

(g) A combination of these drawbacks prevent the development of a practical method and apparatus for photographing and projecting an entire environment on the interior of a spherical theater.

OBJECTS AND ADVANTAGES OF THE INVENTION

Therefore it is the object of the present invention to describe a method and apparatus for an environmental imaging system comprising a modular camera and matching projection system based on the twelve-sided dodecahedron, for photography and projection of high-resolution pentagonal images which are apparently continuous over an interior surface covering a hemisphere or more, thereby capturing and creating the impression of a total environment in a dome or spherical theater.

Another object of the present invention is to describe the essential geometrical alignment of these modular elements of both the camera and the projector according to the dodecahedron which enable this to be done.

Another object of the present invention is to describe a standard pentagonal picture shape which is a more efficient use of the image produced by a lens than regular rectangular pictures, and which can be multiplied to give full coverage of a hemisphere or even a full sphere, with equal resolution both above and below the horizon.

Another object of the present invention is description of its elements in terms of a video system, in relation to existing hardware.

Another object of the present invention is the description of a masking processor to give further control over the shape of individual facets sufficient to create an overall apparent picture of infinite size and shape.

Another object of the present invention is to describe a modular camera system of interchangable parts, where a configuration sufficient to photograph an entire hemispherical field of view or more can be made portable by a single camera operator.

Another object of the present invention is a description of an electro-optical lens, which includes a method of warping the video image produced by a camera module lens in a manner to produce the effect of a lens with two optical centers, thereby producing two pentagonal pictures from one camera module.

The present invention has many advantages over the existing art, including:

(a) A compound camera allows greater resolution and overall performance than a single-camera system.

(b) The use of a pentagon as a standard shape allows a spherical surface to be divided evenly and exactly, and makes more efficient use of the available lens image than existing rectangular formats, producing 42% greater average image quality per lens than the usual theatrical aspect ratio of 1:1.85.

(c) The use of a standard alignment topology according to the dodecahedron yields a camera system of modular, interchangable parts and a projection system which is modular and interchangable as well, both producing pentagonal images which will always match up along every edge.

(d) A compound video camera system is light and portable compared to a compound film camera because the compound video camera can be separated from its recording medium. The use of video allows longer recording time, a steadier image than film photography and projection, and the possibility of manipulation of the image because the electrical signals representing this image are accessable before it goes to the recording medium, and as it is being replayed from the recording medium and going into the video projector.

(e) The electronic control possible in an electronic image such as video means that the aspect ratio of the projected image can be controlled in a fluid manner through the application of control voltages or algorithms, leading to the production of an overall projected image of infinite shape.

(f) Manipulation of the signal representing the camera image can also be done to yield an image showing the effect of a lens with more than one optical center.

(g) The combination of these and other factors make the present invention a practical method for wide-angle video photography and projection on a spherical surface, up to the recording and presentation of apparently continuous environments encompassing an entire spherical view.

Other objects, advantages and novel features of the present invention will become apparent from the following detailed description of the invention when considered in conjunction with the accompanying drawings.

BRIEF DESCRIPTION OF THE DRAWINGS

FIG. 7 is a block diagram of one module of the camera system.

FIG. 8 is an illustration of the typical pentagonal picture shape and alignment for above-the-horizon photography.

FIG. 9 is a block diagram of one module in the projection system.

LISTED PARTS IN DRAWINGS

Figure 1:
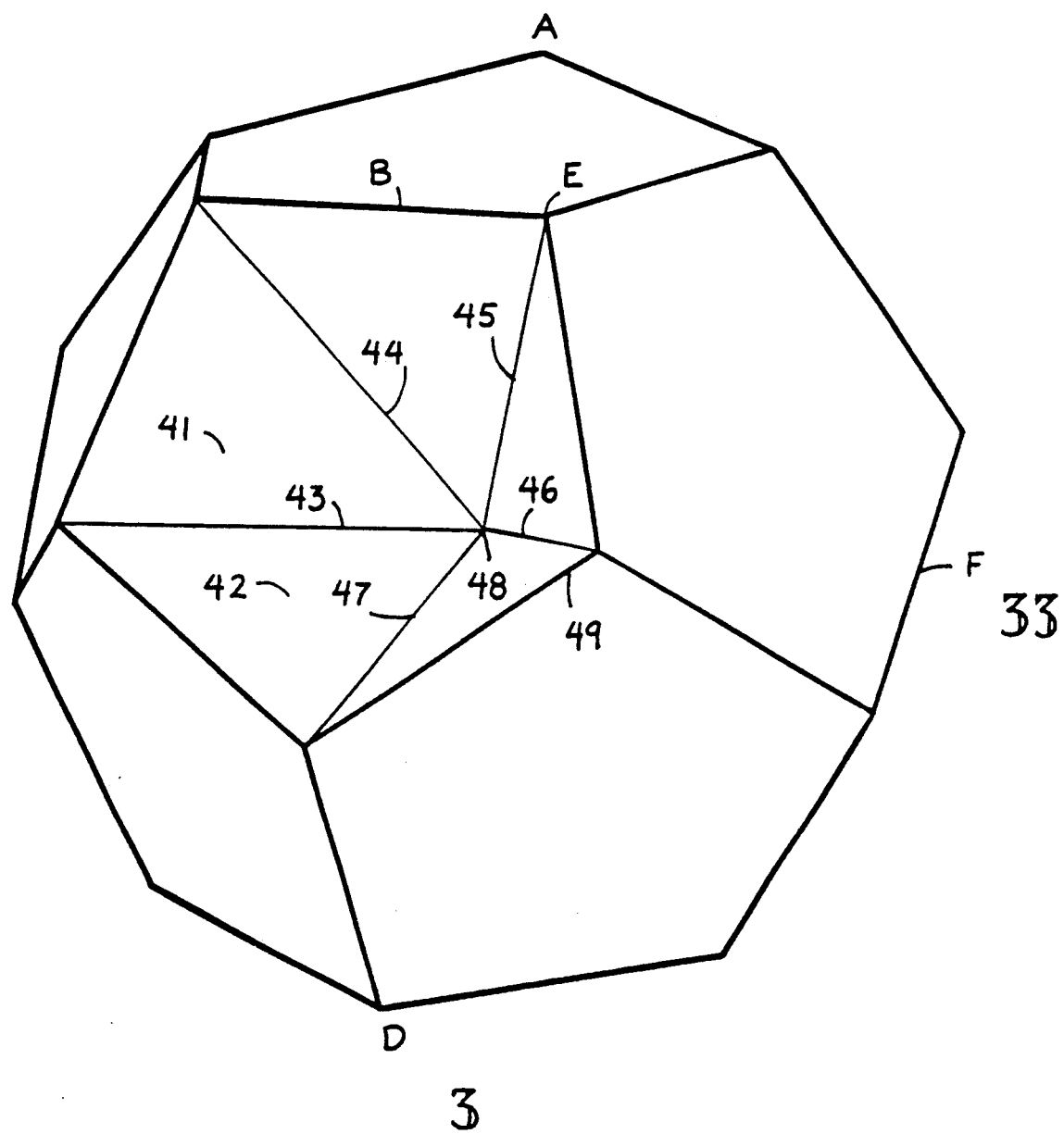
FIG. 1 is a perspective view of a dodecahedral solid with one of its sections removed, showing both the boundaries between adjacent sections, and lines radiating from a central point to the corners of the outside pentagonal face of the missing section.

41: Indicated module
42: Adjacent module
43: Line from Center to corner #1
44: Line from Center to corner #2
45: Line from Center to corner #3
46: Line from Center to corner #4
47: Line from Center to corner #5
48: Center of dodecahedron and system
49: Pentagonal face of dodecahedron (flat)
50: Dodecahedral lens mount
51: Indicated detached module
52: Pentagonal picture from module, projected on sphere
53: Lens axis for this pentagonal picture
54: Vertical axis for top module
55: Dodecahedron
56: Sphere
57: Cross-section angle of view of screen (69.094849°)
57a: Angle between optical axes to face centers (63.434946°)
58: Hemispherical field of view (180 degrees)
59: Standard optical axis for above-the-Horizon photography
60: Horizon line
61: Standard elevation above horizon line (26.565054°)
62: Below the Horizon photography standard axis
63: Negative elevation for below horizon line (26.565054°)
64: Angle of lens field of view (74.754752°)
65: Circular lens image around pentagon
66: Hard cropped pentagon picture boundary
67: Pentagon picture shape
68: Portion of pentagon
69: Area outside pentagon
70: Portion to be shown added onto another screen
71: Screen added onto (complete screen)
72: Contiguous portion #2
73: Contiguous portion #3
74: Outer collar ring
75: Inner collar ring
76: Outer cone
77: Inner cone
78: Lens mount for individual lens
79: Automatic focus sensor
80: Automatic exposure sensor
81: Cable carrying focus and exposure readings out
82: Cable carrying focus and exposure control in
83: Channel in ring point area for carrying cables
84: Focus control motor
85: Exposure control motor
86: Charge Coupled Device (CCD) in camera
87: CCD controller in camera
88: Control cable to sync source
89: Power cable
90: Amplifier and electro-optical transducer
91: Fiber optic camera cable out
92: Breech end of module
93: Exterior face connector #1
94: Exterior face connector #2
95: Exterior face of module
96: Male dog connector
97: Female dog slot
98: Screw hole for extraction
99: Lens front
100: Upper edge on module (ring)
101: Lower point on module (ring)
102: Set screw #1 for ring
103: Set screw #2 for ring
104: Boundary of camera module
105: Lens symbol for camera
106: Exposure and focus control sensors
107: Exposure and focus evaluation processor
108: Exposure and focus control line
109: Motorized focus and exposure control
110: External sync source
111: Sync connection to other modules
112: Recorder
113: Frame buffer
114: Pentagon top edge (for above the horizon photography)
115: Pentagon bottom point (for above the horizon photography)
116: Horizon line on screen
117: Boundary of projection module
118: Video source, either camera or recorder
119: Masking processor
120: Matte source
121: Component video signal
122: Red lightvalue
123: Green lightvalve
124: Blue lightvalve
125: Red beam light generator
126: Green light beam generator
127: Blue light beam generator
128: Red fiber optic cable
129: Green fiber optic cable
130: Blue fiber optic cable
131: Flat mirror
132: Rotating mirror wheel
133: Projection lens
134: Projection screen surface
135: Border of original raster scan
136: Innermost line of cropping for soft edge
137: Outermost line of cropping for soft edge
138: Optimum circular lens image
139: Aspect ratio of 1:1.33
140: Aspect ratio of 1:1.85
141: Optical center of lens, and of original photography
142: Aspect ratio of 1:1.37
143: Aspect ratio of 1:1.77 (9:16)
144: Video scan line of indicated module
145: Video scan line of adjacent module
146: Zenith screen Z
147: Top-adjacent screen at 12:00 A
148: Next screen clockwise at 2:24 B
149: Next screen clockwise at 4:48 C
150: Next screen clockwise at 7:12 D
151: Next screen clockwise at 9:36 E 152: Orientation arrow indicator
153: Left dual pentagon
154: Right dual pentagon
155: HDTV video border
156: Side pentagon tip
157: Grid line image
158: Barrel distortion
159: Counter distortion of raster scan in electro-optical lens
160: Final sum grid line image from electro-optical lens
161: Left dual optical center
162: Right dual optical center
163: Distortion pattern of left dual pentagon
164: Distortion pattern of right dual pentagon
165: Video scan line example
166: Left dual optical axis
167: Right dual optical axis
168: HDTV image on sphere
169: Spherical field of view
170: Dodecahedral camera or projector
171: Assembled camera of eleven modules
172: Contour grip
173: Exposure and focus readout
174: Trigger
175: Tripod mount
176: Bundled cable from camera
177: Hand holding camera by contour grip
178: Assembled camera of six modules
179: Support in form of a helmet
180: Readouts in brim
181: Cable from exterior face
182: Cable from point channel
183: Cables out from camera
184: Edge-based camera for single coverage
185: Electro-optical lens
186: Side edge-oriented axis
187: Left side of dual screen field of view
188: Right side of dual screen field of view
189: Top view of camera
190: Top edge target for orientation
191: Left side edge for orientation
192: Right side edge for orientation
193: Zenith screen from triple-screen extraction
194: Left side screen
195: Right side screen
196: Concentric region displayed by other modules
197: Example of border of displayed region
198: Area of reduced brightness
199: Vertex-based compound camera
200: Vertex-based camera module or facet
201: Vertex camera module electro-optical lens
202: Vertex camera perspective view
203: Axis of orientation to dodecahedral vertex
204: Axis to zenith
205: Flat screen outline
206: Horizon line on screen
207: Geodesic grid on screen
208: Diagram of screens together
209: Individual outline of outside screen with polar distortion
210: Virtual image of twelve screens as a disc
211: Compressed outline of outside screen
212: Viewfinder window
213: Axes of movement
214: Group of three lasers
215: Group of three lightvalves
216: Fiber optic laser cable
217: Connector to module at projection head
218: White laser beam
219: Sync distribution amplifier
220: Baffle between projection modules
221: Theatrical projection bulb
222: Liquid Crystal Display transparency
223: Glass-walled water cooling barrier
224: Supercooled gas cooling pipes
225: Radius of pentagonal face (1.00)
226: Altitude of pentagonal face (.809)
227: Half of a dodecahedral edge (.588)
228: Radius of circumsphere (1.6473)
229: Radius of intersphere (1.5388)
230: Radius of insphere (1.3090)
231: Half of dihedral angle between faces
232: Interior angle between edge center and pentagonal point
233: Interior angle between pentagonal point and center
234: Interior angle between pentagonal center and base.

DETAILED DESCRIPTION OF THE INVENTION

Optimum brightness and resolution for a picture to cover the interior of a dome theater naturally come when more than one camera and projector is used. The challenge is to find a simple standard format for each component of this multiple picture, one which ensures that the mosaic will fit together to produce a continuous image on the spherical screen, with maximum resolution and minimum distortion.

The zone of best image reproduction by a lens is typically a circle, with the optical axis at the center, because loss of performance typically is proportional to distance from the optical axis. The radius of this circle defines the radius of the best quality picture.

The optimum format therefore would be close to this circular shape, and capable of dividing a hemisphere or a sphere into a moderate number of equal sections.

The typical rectangular format wastes much of the circular area of optimum lens image. A rectangular picture with an aspect ratio of 1:1.33 can only encompass 61% of the circle. Moreover, a sphere cannot be divided evenly into rectangles.

The regular polyhedrons or Platonic solids have the advantage of even division of a sphere. They use triangular, square and pentagonal facets. Of these, a triangle can only encompass 41% of the optimal circle. A square, the basis of a cube, can encompass almost 64%, but a hemisphere does not lend itself to even division into squares. The pentagon, the basis of the twelve-sided dodecahedron, encompasses the most of all, 75.71% of the optimal circle, and only six pentagons are required to cover half of a sphere. Therefore a pentagonal image, arranged according to the dodecahedron, is clearly the best choice.

The present invention could be applied to still image projection such as for slides, or for photography and projection using small-format motion picture film such as 8 or 16 mm. However, video has many advantages. Video cameras are becoming smaller, and video resolution is improving with the introduction of High Definition Television (HDTV). So the present invention will be described in terms of a portable compound video camera and compatible laser video theater projection system, with means to photograph and display an apparently continuous image across a surface of a hemisphere or more. Making further use of the advantages of video, a masking processor to produce overall screens of variable shape and size, and an electro-optical lens which can be used to double either coverage or resolution will be described.

FIG. 1 shows a perspective view of a dodecahedral solid with one of its sections removed, with an indicated module at 41 and a module adjacent to it at 42, representing modules of the compound camera system. At 43, 44, 45, 46 and 47 are lines radiating from a central point 48 to corners of the outside pentagonal face 49 of the missing section, representing the projection of an image from a central projection system onto a pentagonal screen. This defines the basic dodecahedral topology of the modules of both the camera system and the projection system in the present invention.

Figure 2:
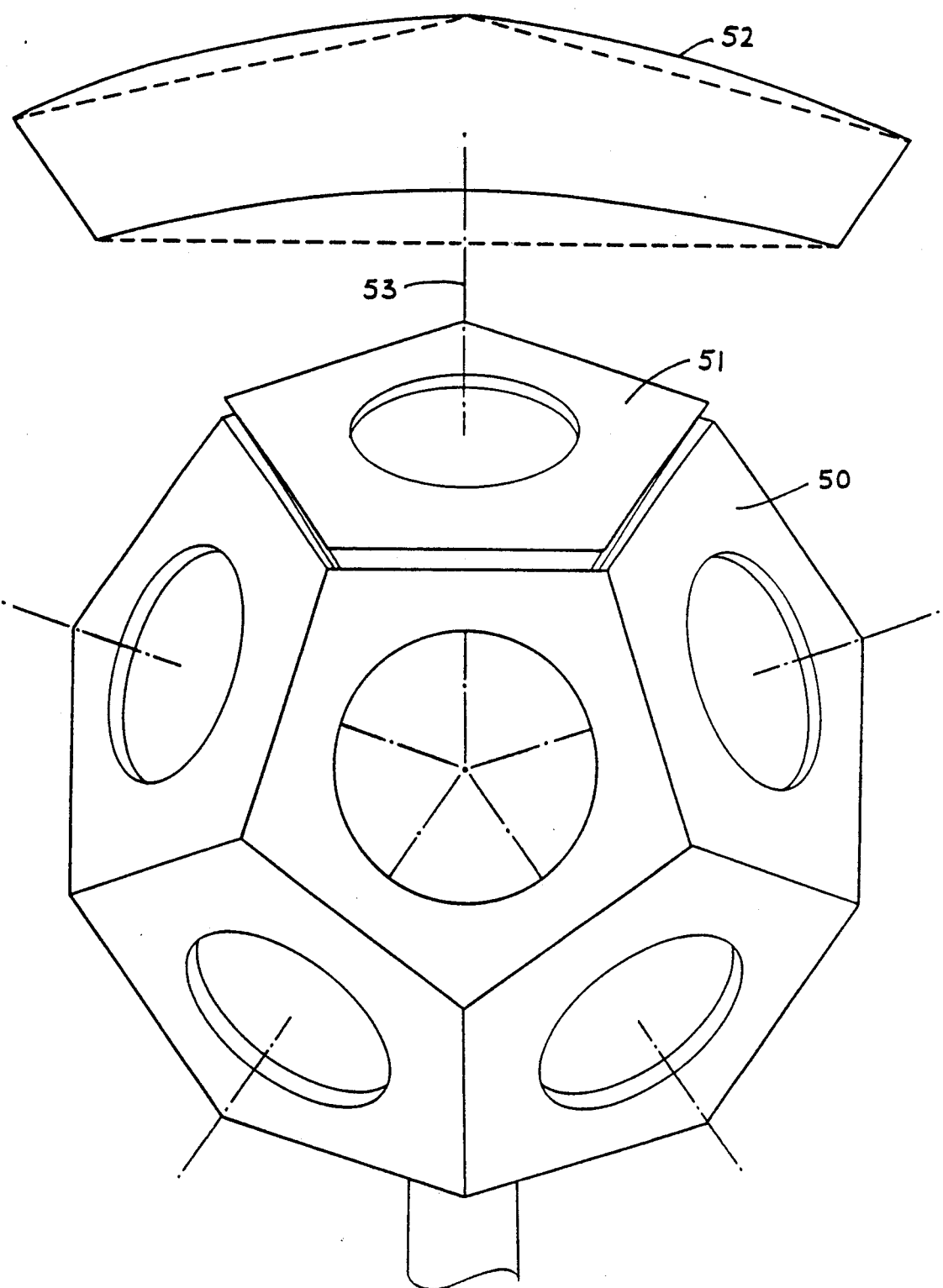
FIG. 2 is a perspective view of the dodecahedral arrangement of optical axes in the lens mount of both the projection and the camera system, and the pentagonal picture common to both.

FIG. 2 shows the dodecahedral lens mounting characteristic of both the compound camera and the compound projector, indicated by 50, with 51 as one of the individual modules detached in an exploded view. The pentagonal field of view produced by each module, as projected onto a sphere, is represented by 52, with 53 representing the lens axis of the lens in that module.

Figure 3:
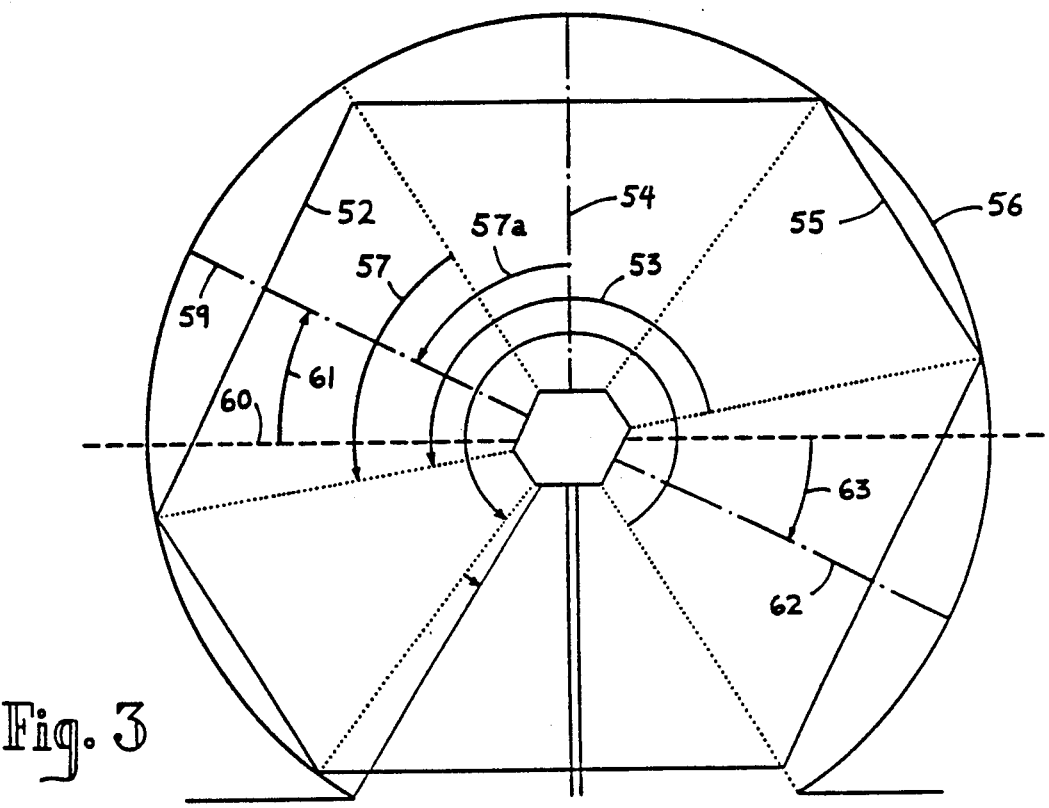
FIG. 3 is a schematic illustration showing a cross section of the field of view covered by such a compound camera and projector system.

FIG. 3 is a schematic view showing the total spherical field of view of this system, shown on a cross section represented by plane ABCD of FIG. 1. Note the asymmetry of cross sections of the dodecahedron. The optical axis 54 of the uppermost module points straight up in the embodiment described here. It has the advantage of allowing the camera system to photograph, and the projection system to reproduce, a full hemispherical field of view down to the horizon in all directions, with only six pentagons. For this reason, this arrangement of six modules will be described as for above-the-horizon photography.

However, it will be understood that other orientations of the portable camera are possible. The projector orientation could be different as well, such as in a dome tilted to allow for conventional theatrical seating of an audience, as is done in OMNIMAX theaters.

The boundaries of the pentagonal screens of the projection system are defined by a dodecahedron 55 projected against a sphere 56. The angle of view of an individual screen 52, from top to bottom, is at 57, equal to 69°, 5′, 41.4564 (69.094849°). At 58 is the total field of view, equal to 180 degrees, covered by six modules together, three of which are shown in this cross section. At 59 is a standard optical axis for photography and projection of pictures above the horizon line 60 with the exception of the module pointing straight overhead. This optical axis has an elevation 61 above the horizon line. For photography below the horizon, the optical axes 62 have a negative elevation 63 of −26 (−26.5666 degrees).

Figure 4:
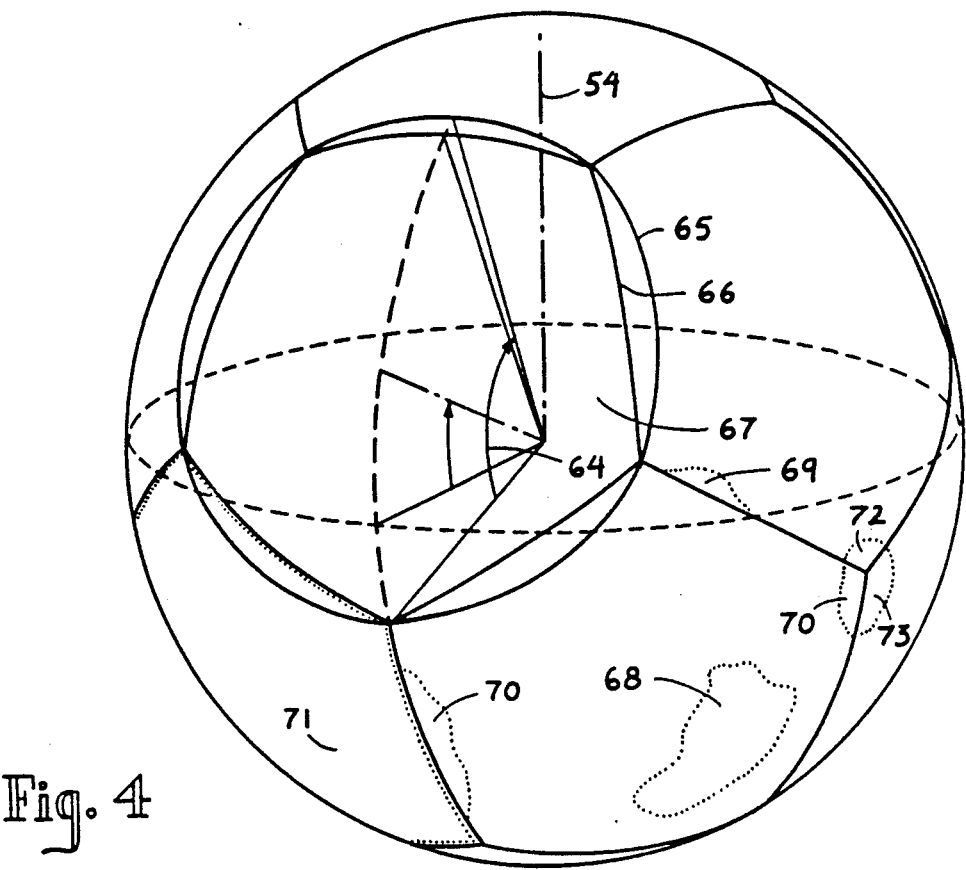
FIG. 4 is a perspective view showing a spherical surface divided into the pentagonal sections corresponding to the modules of such a camera and projection system.

FIG. 4 is a perspective view showing a sphere divided into pentagons projected according to a dodecahedron within. This shows the boundaries between adjacent portions of the field of view in the camera and projection system. The optical axis of the topmost module 54 points straight up in this embodiment.

In the camera system, the width of field of view for the lens for a pentagonal picture is shown at 64, defining a circle 65 which touches the points of a projected pentagon 52. The optical axis AO for an individual camera module is raised by an angle 61, equal to 26 degrees, 34 minutes.

Figure 10:
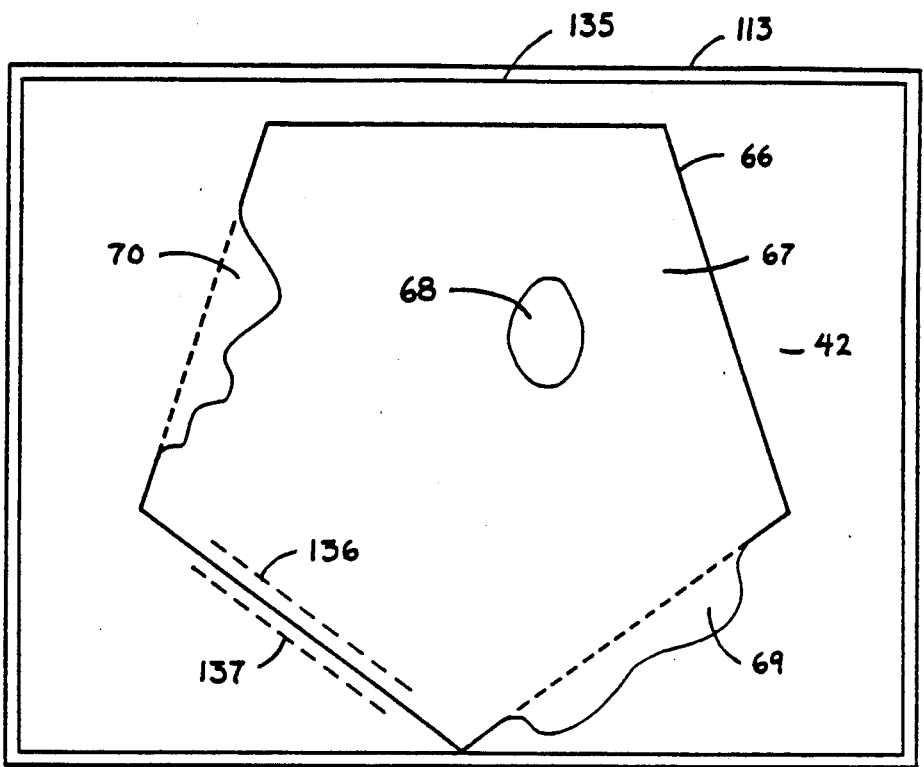
FIG. 10 is an illustration of the types of image cropping performed by the masking processor.
Figure 11:
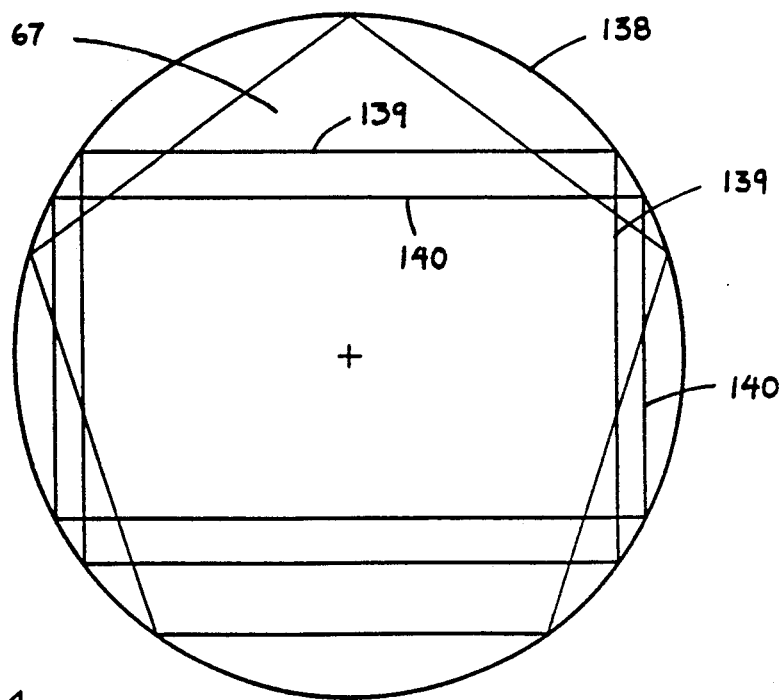
FIG. 11 is an illustration comparing a pentagonal image to other film formats in relation to the optimum circular lens image.
Figure 12:
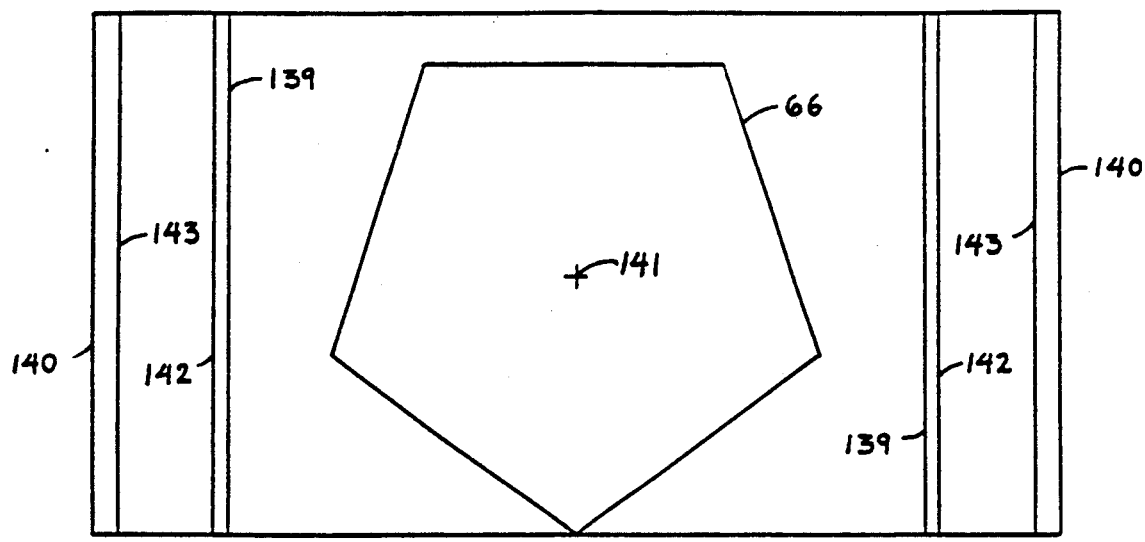
FIG. 12 is an illustration of the extraction of a pentagonal image from original photography in various film and video formats, and the relationship of dimensions between them.
Figure 18:
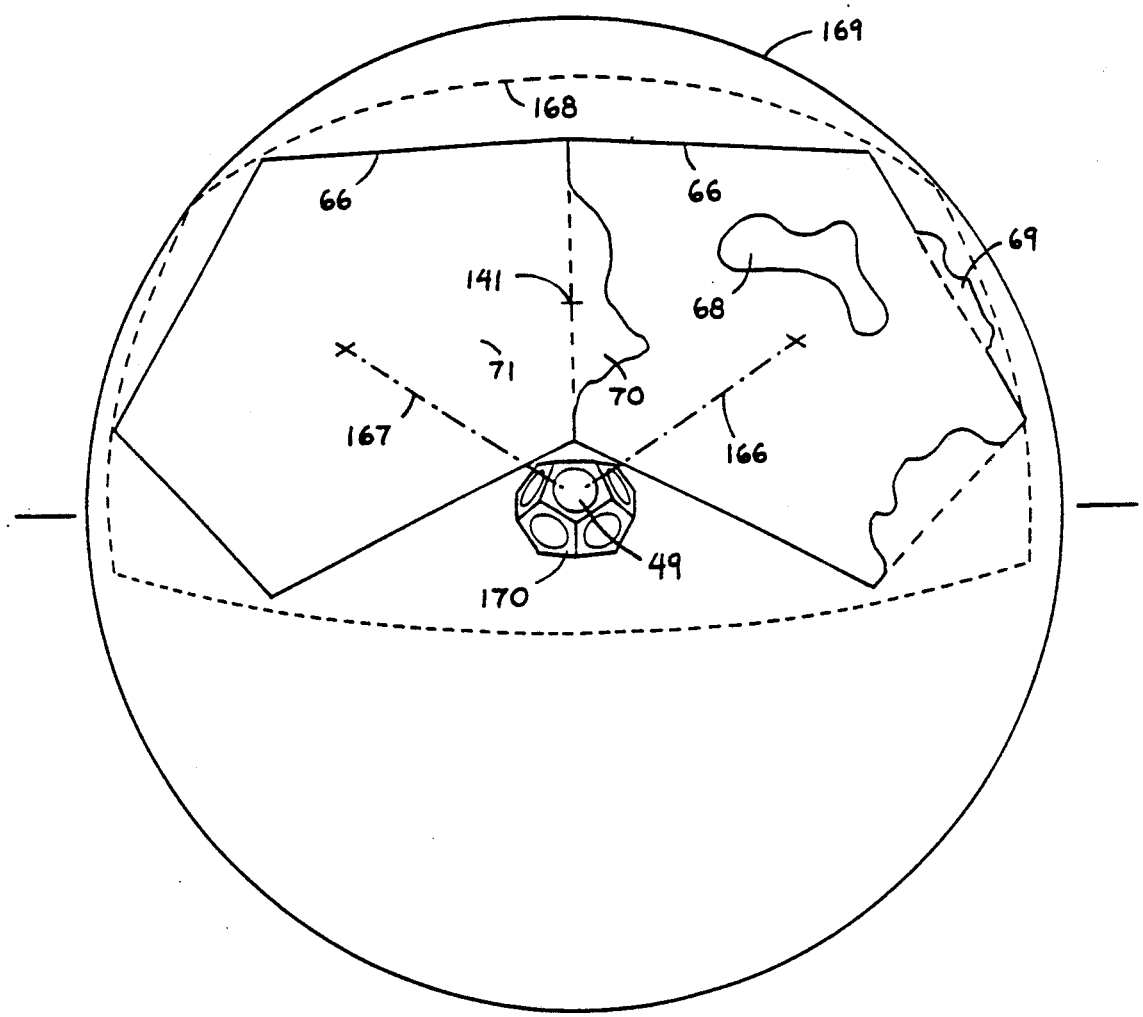
FIG. 18 is a summary diagram of the present invention, an illustration of photography of a portion of a spherical view in HDTV format from a modular camera with a dodechedral lens mount, video distortion with an electro-optical lens, producing more than one optical axis, and corresponding symmetrical pentagonal areas of optical congruence, with cropping to the borders of these areas by a masking processor, which includes the function of further cropping of the image at will, then projection of the resulting video image onto a corresponding sphere from a modular laser HDTV video projector with lenses in an equivalent dodecahedral mount, thereby re-creating that portion of a spherical field of view.

In the video projection system, a video masking processor for the individual projection modules crops the projected camera image, by applying a blanking signal in the manner of a video switcher, to a pentagonal boundary 66 defining a central pentagonal shape 67, as shown in FIG. 11 and FIG. 12, when all of the projection modules are active. In addition to this pentagonal cropping, the masking processor can also be used to reshape the screen, as is also shown in FIG. 10 and FIG. 18, according to additional blanking signals from a video matte source. It can show one or more portions of a pentagon 68, or portions of the camera image 69 outside of a pentagon, if the original photography includes it and the adjacent module 43 is off. It can also show a portion of a pentagon 70 to add to another pentagon 71, or multiple contiguous portions 70, 72 and 73. As long as adjacent screens respect their pentagonal, dodecahedral boundaries, the result will be an apparently continuous overall picture, in a screen of infinite shape or size.

Figure 5:
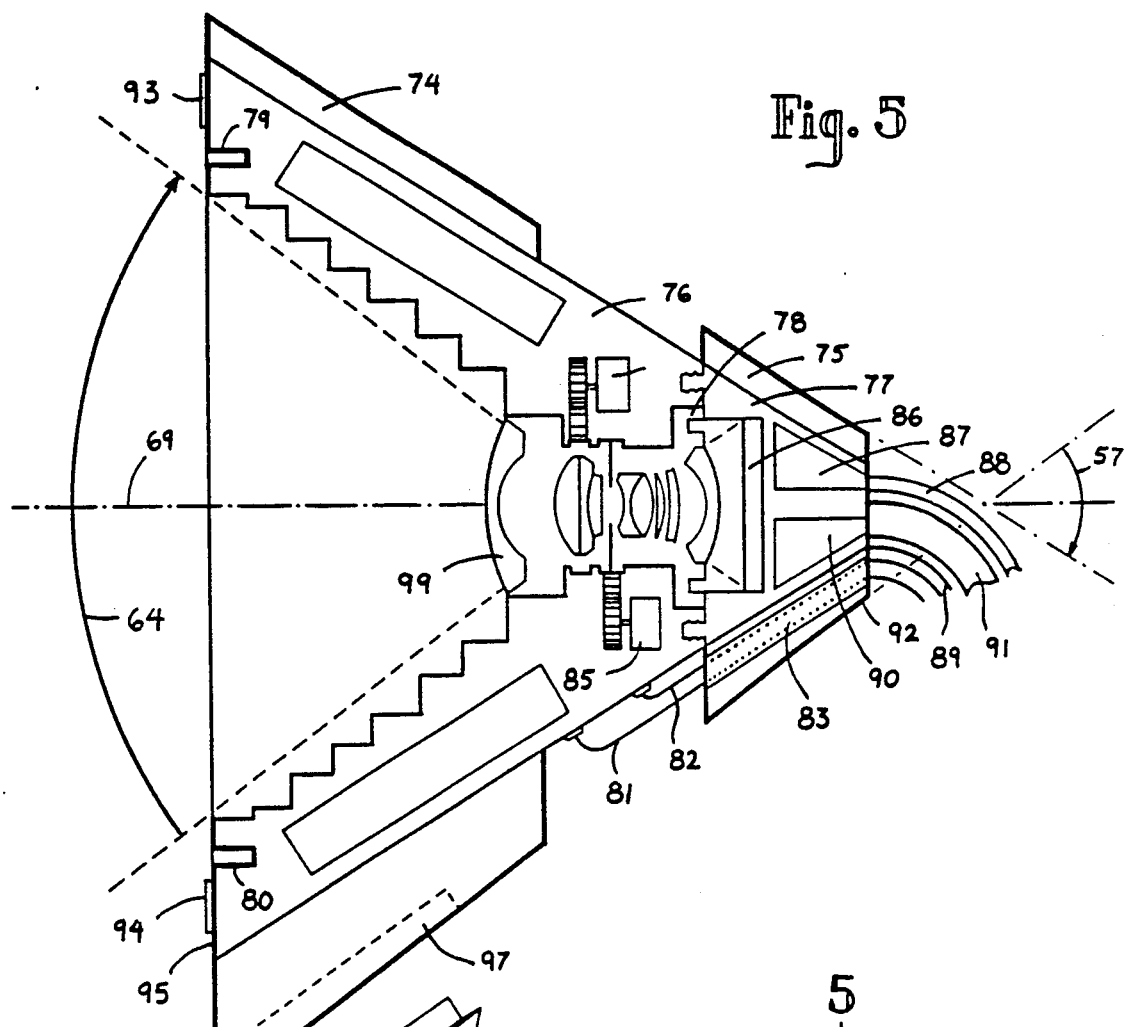
FIG. 5 is a schematic illustration showing a cross section of one module of the camera system.

FIG. 5 shows a cross section of one module of the camera system. For purposes of clarity, the mounts for the lens elements and the internal electronic connectors have been omitted. This cross section shows an idealized view with all of the components aligned along the cross section plane. In practice, these components would be distributed around the circumference of each module.

The basic construction of the module is a cone, with two pentagonal collar rings attached. The outer collar ring is at 74, and the inner collar ring is at 75. The cone has an outer section 76 and an inner section 77, which also includes the lens mount 78, probably a standard Canon B-4 or Fujinon-B mount. The optical axis of the lens, and of the module, is shown at 69.

Sensors for automatic focus and exposure are shown at 79 and 80. A cable carrying readings from the sensors for exposure and focus is at 81, and a cable for carrying control signals back to the motors to actually make the settings is at 82. These cables are shown connected to the side of the inner cone, by making use of a channel 83 in the inner collar ring made possible by the greater distance from the cone walls found at the pentagonal points. The motor to control focus on the lens, through dual gears, is shown at 84, and to control exposure at 85.

The focal length of the lens is calculated according to the formula $$F = \frac{D \times A}{O}$$

where O is the size of the object in front of the camera, D is the distance from the photographed object to the lens, A is the size of the image formed by the lens, and F is the focal length of the lens.

A Charge Coupled Device (CCD) upon which the image is formed is shown at 86. In the preferred embodiment of the invention, given a circular image 16 mm (0.63 in.) in diameter being formed on the CCD, which is the same height as the standard 35 mm motion picture film image, and approximately the same diagonal length as the standard 16 mm motion picture, this lens would have a focal length of 10.479 mm., and a field angle of at least 74.7548 degrees, shown at 64, which is usually described as a moderately wide angle lens. The lens shown here is based on the Leitz Elmarit-M f2.8 lens with a field of view of 76 degrees.

A smaller focal distance has the advantage of a much greater depth of field, so the image is kept in focus over a much wider range of distances. The hyperfocal distance of an 10.5 mm lens is about 1 foot at f16, so everything beyond that distance, out to infinity, will be in focus, within an acceptable circle of confusion of 0.001″, which is standard for 35 mm motion picture photography. This extreme depth of field means that the automatic focusing system described above could be made optional.

The electronic controller for the CCD is at 87, slaved to an external sync source through the control cable 88. This external sync source is used to lock together all of the modules of the camera system. Power for the module's motors and electronics is supplied through the power cable 89.

In the preferred embodiment of the present invention, a High Definition Television signal is produced by the CCD. A three-CCD arrangement, with a retrofocus lens and a dichroic prism, can be used if necessary to extract the components of a color picture, or to increase resolution. An example of a small, high quality triple CCD camera is the Sony DXC-750. According to NHK Labs, an HDTV CCD would be a 25.4 mm (1") imager with 80 dB of dynamic range and 25 megahertz of horizontal resolution. Since there are many competing proposed HDTV standards at present, for the purposes of this discussion, the equipment for the Sony HDTV standard, known as HDVS or MUSE, will be given. However, it will be understood that this invention could be easily adapted to other television standards, including PAL and NTSC video.

An amplifier and electro-optical transducer for converting the video information from the CCD to light impulses is at 90. This transducer performs the same function as the Sony HDFT-100 HD Optical Fiber Transmitter. The light impulses thus created travel into the fiber optic cable 91. This cable could be Sony HDFC Optical Fiber Camera Camera Cable, in an appropriate length. For a thinner cable, capable of transmission over long distances, this could be a single fiber optic cable, following the methods described in the paper "Transmission of HDTV and Audio Signals Over One Single-mode Fiber" in the SMPTE Journal Sept. 1989 pp. 651–657.

The cables to and from the module are shown here coming from its interior breech end 92. This has the advantage of automatically bundling the cables into a central strand coming down out of the hub of the compound camera. This, however, depends on the cables being small enough and having sufficient flexibility to fit into this interior hub space. A viable alternative is to have these cables emerging from one or more connectors 93 and 94 on the exterior face 95 of the module, at locations where they would still be invisible to the lens. The interior lens collar 75 then could be solid, continuing all the way into the center 48, which allows quicker and more precise alignment of adjacent modules from more contact area between them.

Modules are locked together at their points. This is done with a male dog 96 coupling a female dog 97. Each male dog has three tapering flukes, each a dovetail tongue in a homologous rabbet, as screeds in a scarf. Uncoupling is done using a screw hole 98 for an extraction tool.

The preferred embodiment for the original photography in each camera module is a rectangular image, because it includes an extra area outside the pentagon available to be chosen for display, and because rectangular CCD's and raster scans are already standard. A pentagonal CCD in the camera, however, would require less video bandwidth in its recorder and transmitter.

Figure 6:
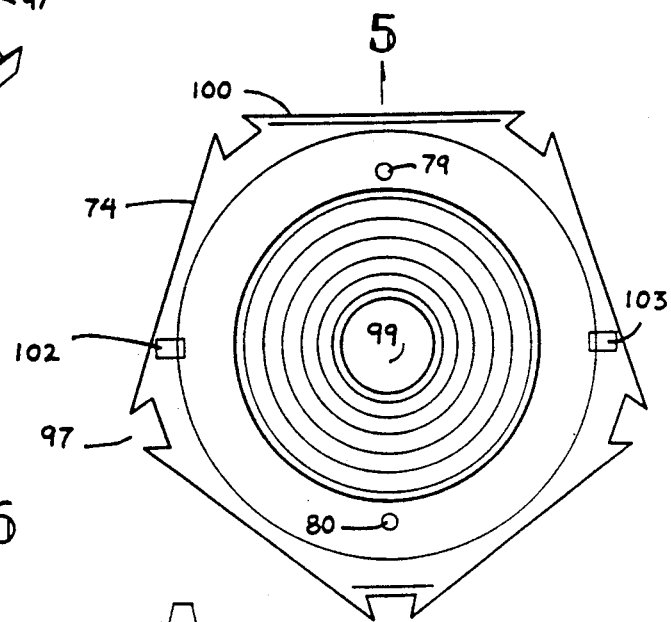
FIG. 6 is a schematic illustration showing a front view of one module of the camera system.

FIG. 6 shows a frontal view of the camera module. The front element of the lens is at 99, and the outer collar ring is at 74. This collar includes a female dog slot 97 at each corner. These are for a male dog connector 96, composed of three dovetail connectors aligned in an equilateral triangle, with a threaded hole in the center 98 for an extraction tool. This connector is slid between the points of adjacent modules to lock them together in the proper alignment.

Sensors for automatic focus and exposure are shown at 79 and 80, and optional connectors on the front face for cables are shown at 93 and 94.

For photography above the horizon, with the exception of the module facing the zenith, the horizontal edge 100 on both the inner and the outer collar ring is always uppermost. For photography below the horizon, the inner and outer collars must be rotated 180 degrees relative to the inner cone so that the point 101 is uppermost. Two set screws in a horizontal line, shown at 102 and 103 for the outer collar, are used to lock the collars in place for either orientation. The space which would be occupied by a camera module pointing straight down is reserved for cables to and from the hub of the composite camera. Up to 11 modules may be locked together in this way, to cover nearly a completely spherical view. If the camera cables are attached to the outside faces of the modules as described above, up to 12 modules could be locked together, to photograph an entire spherical point of view.

FIG. 7 shows a block diagram of the camera module, showing the components both inside and outside of the boundary 104 of the module itself. The optical axis of the module is at 53, and the angle of view of 74.75 degrees is shown at 64. For an electro-optical lens producing two or three screens, as described below, this angle would be up to 150 degrees. The lens is at 105. A sensor for exposure and focus control is shown at 106, with its readings going to a central processing unit 107. The processor evaluates the exposure and focus readings for the various modules, using weighting toward one module or zone if desired, then sets the overall exposure and focus for all of the modules, along line 108, implimented by a motorized exposure and focus control 109. Using the same setting for all of the modules prevents apparent discontinuities between different screens due to either exposure or focus differences. However, given digital control of the picture elements on the CCD, it is also possible to have an exposure setting that varies across the area of an individual screen. Toshiba and Hitachi are among the companies who are currently exploring digital irises.

An external sync source 110, which is also connected to the other modules along line 111, drives a CCD control unit 87, which scans the individual picture element light readings from the image being formed on the surface of the CCD 86. This scanning function can be distorted by the electro-optical lens described below, and portions of the picture information can be deleted by the masking processor to be described. The electrical impulses created from this scanning of the picture elements, representing a video image, go to an amplifier and electro-optic transducer 89 which turns the electrical impulses into light, which is carried out along a fiber optic cable 91, directly to the projection system in a closed-circuit system, or into a recording device 112. If the electro-optical lens distortion and the masking processor cropping of the video image are not performed during the scanning of the picture elements on the CCD, they are performed in a frame buffer 113 midway between the camera and the projection system, either before or after a recording device.

The light impulses from each camera module could be turned back into electricity by a device such as an HDFR-100 Optical Fiber Receiver, and pass through a processor, such as an HDT-1000 HD TBC/Signal Processor, for maximum clarity before going to the recording device. For optimum bandwidth at minimum recording medium size, this recorder would be a digital HDTV (High Definition Television) video disc recorder. However, a Sony HDV-1000 Video Tape Recorder could also be used.

FIG. 8 shows an illustration of the typical pentagonal picture 67 as projected by the projection system. The orientation of the pentagonal picture shown, with the edge 114 up and the point 115 down, is characteristic of every module but the zenith in a six-module camera system capable of photographing a complete hemispherical view down to the horizon in every direction. For this reason, this orientation of the camera module and its pentagonal picture will be described as the above-the-horizon orientation. The level of the horizon is indicated on the screen at 116.

FIG. 9 shows a block diagram of one module of the projection system, showing the components both inside and outside of the boundary 117 of the module itself. For best optical results, the size of the projection modules should be as close to the size of the camera modules as possible. The source of the video image, either the camera module in a closed-circuit system, or a video recorder, is at 118.

The masking processor 119 crops this video image in the manner of a video switcher according to templates provided by a video mask or matte source 120. These templates include the main pentagonal mask, and additional masks to reveal portions of the image for display in combination with other images to produce overall pictures of variable shape and size.

The masking processor then outputs, in the form of a red, green and blue composite video signal 121, the video image to be shown to its respective display generator in the projection system. In this display generator the signals representing the red, green and blue components of the video image are used to control three lightvalves, shown at 122, 123 and 124 respectively, such as variable density filters, variable electrical resistors or variable reflectivity mirrors. These lightvalves vary the intensity of light from three light beam generators for red, green and blue, shown at 125, 126 and 127 respectively.

In the preferred embodiment for projection, and the system described here, the light generators for the projection system are large frame ion lasers, a krypton laser for red, and another argon laser for blue and green, thereby producing a white beam. An example is the large-scale laser video projection being done by Laser Creations of London, England, who recently demonstrated large-scale Sony HDTV projection in Paris. Their Laser Video Projector (LVP) can even combine a raster-generated video image with a vector-generated laser effect. With large frame lasers, they can generate 9 watts of peak white light, equivalent to 8800 perceived lumens, for a maximum diagonal image size, in zero ambient light and with a unity gain screen, of 36.58 m (120'), with infinitely deep focus. They employ Spectra Physics 2040 model large-frame lasers in an improved version of the Cavendish system, a 5 watt krypton laser for red and a 15-20 watt argon laser for blue and green, with further control for true color provided by small-frame krypton and argon lasers pumping tunable dye lasers. The advantage of a laser projection system lies in the fact that as laser light is the purest and most controllable colored light available, it would theoretically yield the most vivid picture. The disadvantage is that currently large frame lasers are expensive (about $60,000 each), require an extensive water cooling system (54 liters/min at 70 psi for each large-frame laser), and use a large amount of power (3-phase, 208 v, 80 KW per laser). Another disadvantage is that at present, laser projectors are not as bright as video projectors using incandescent theatrical light sources. There also tends to be a "sparkle" effect in the image produced by the laser illuminating minor irregularities in the projection screen. Visulux, of San Jose, Calif., reportedly has an improved projector that does not have this problem.

Here, for the sake of clarity, the beams produced by these lasers are separated, travelling first into fiber optic cables for red, green and blue, shown at 128, 129 and 130, respectively, to the projection head containing the lenses. Thus the size of the projection head can be made quite small, to approach the size of the camera head.

In the projection head the beams are reflected by a mirror 131 which controls vertical scanning, and a rotating octagonal mirror wheel 132, which controls horizontal scanning, thereby producing a raster scan. These mirrors are under the control of an external sync generator 110 which is linked to all of the modules of the system along the line 111. The reflected laser beams then pass through a projector lens 133 and fall upon a spherical screen surface 134, forming a video image. When combined with the images formed by the other projector modules, an apparently continuous picture across the interior of a hemisphere or more is thereby formed.

In the simplest and most straightforward embodiment of the present invention, there is a one-to-one correspondence between camera and projection modules, with both having an optical axis 53 identically aligned perpendicular to the center of a face of a dodecahedron, and a matching field of view 57. When electro-optical lenses are involved, however, each camera module can cover more than one pentagonal section. These different sections can be assigned to their respective projection modules, for single coverage, or if the projection modules are also capable of covering more than one section, then pentagonal pictures can be made to overlap, for increased resolution.

FIG. 10 shows the types of image cropping performed by a masking processor before a video image is projected. This cropping can be performed in the camera module system prior to image recording, but in the preferred embodiment described here, it is described as part of the projection system.

At 135 is the border of the raster scan produced by the camera module. If the cropping described here is not performed as a function of the CCD pickup control, then the information representing this raster scan goes into a frame buffer 113, where it is available to both the masking processor described here and the distortion from an electro-optical lens described below.

The primary task of the masking processor is to enforce a pentagonal, dodecahedral boundary 66 between adjacent screens.

It crops the image to a boundary defined by its central pentagonal portion 67 when the projection module adjacent to that boundary 42 is active, and that projection module is displaying a picture extending to that boundary. Thus, if all of the projection modules are active and displaying their largest screens, all of those screens would be pentagons.

The masking processor performs all of its cropping functions by the application of blanking signals to the video raster, in the manner of a video switcher. Cropping with a soft edge is preferred, with a linear progression from an innermost line 136 to an outermost line 137, where the IRE level is held at 0 for all blanked areas, unlike the usual projected "video black" of IRE 7. This is to prevent double-exposures and erase the boundaries of the original image, leaving an apparently continuous composite projected image.

In addition to defining the pentagonal boundary, this masking processor can also be used to produce a screen of infinite shape, by allowing through different areas of the original photography, according to additional blanking signals produced by templates provided by a video matte source 120. Portions smaller than the pentagon 68 can be displayed, as well as sections 70 to be shown contiguous to the images from other modules, thereby producing non-pentagonal overall projected images. Portions from outside the pentagon of an individual module 69 can be shown, extending into an adjacent face, as long as the original camera photography included those portions of the image, and the projection module for that adjacent face is inactive. As long as adjacent images remain divided by their pentagonal borders, the net effect will be apparently continuous screens of any size or shape.

FIG. 11 shows an illustration of a division of the optimum lens image 138 into the pentagon 67, as compared to rectangular division into the 1:1.33 aspect ratio 139 common to TV, and the 1:1.85 aspect ratio 140 common to film. A pentagon encompasses 75.71% of the circular lens image, 23.9% more than can be achieved with an aspect ratio of 1:1.33, and 42% more than a 1:1.85 aspect ratio. Thus, using the same lens, a pentagonal picture yields up to 42% better average resolution.

FIG. 12 shows the extraction of a pentagonal picture from a camera module's rectangular raster-scanned image in one of the popular film or television formats, showing the relationship of dimensions between this projected pentagon to these various formats. The center of the pentagon matches the optical center 141 of the original rectangular picture. The edge of the pentagon is at 66, and the point 115 rests on the bottom edge. Any picture information outside the boundary of the pentagonal picture at 66 will not be shown by the projection module, unless adjacent projection modules are inactive. But if this outside picture is recorded by the camera, it can be available as a reference when displayed by another type of projector or playback monitor.

The widths of various popular formats are shown in relation to the pentagonal picture. At 139 is the boundary of an aspect ratio of 1:1.33 which is used for NTSC video, while 142 shows the edge of the 1:1.37 aspect ratio for non-anamorphic 35 mm motion pictures. At 143 is shown the boundary of an aspect ratio of 1:1.77 or 9:16, used in most current standards of HDTV video, including the Sony MUSE standard. At 140 is the boundary of an aspect ratio of 1:1.85, common to most 35 mm theatrical films. Other theatrical aspect ratios, such as for Super Panavision and 70 mm, can be 1:2.2 or even wider. Given an aspect ratio of 1:1.33, a pentagonal picture with an edge at 66 encompasses 44.7% of the picture area.

If more than six camera modules are grouped together, these extra modules can be described as photographing below the horizon. For below-the-horizon modules, the pentagon is reversed, with the point 115 on the top instead of the bottom. This can be accomplished in the projector's masking processor.

Figure 13:
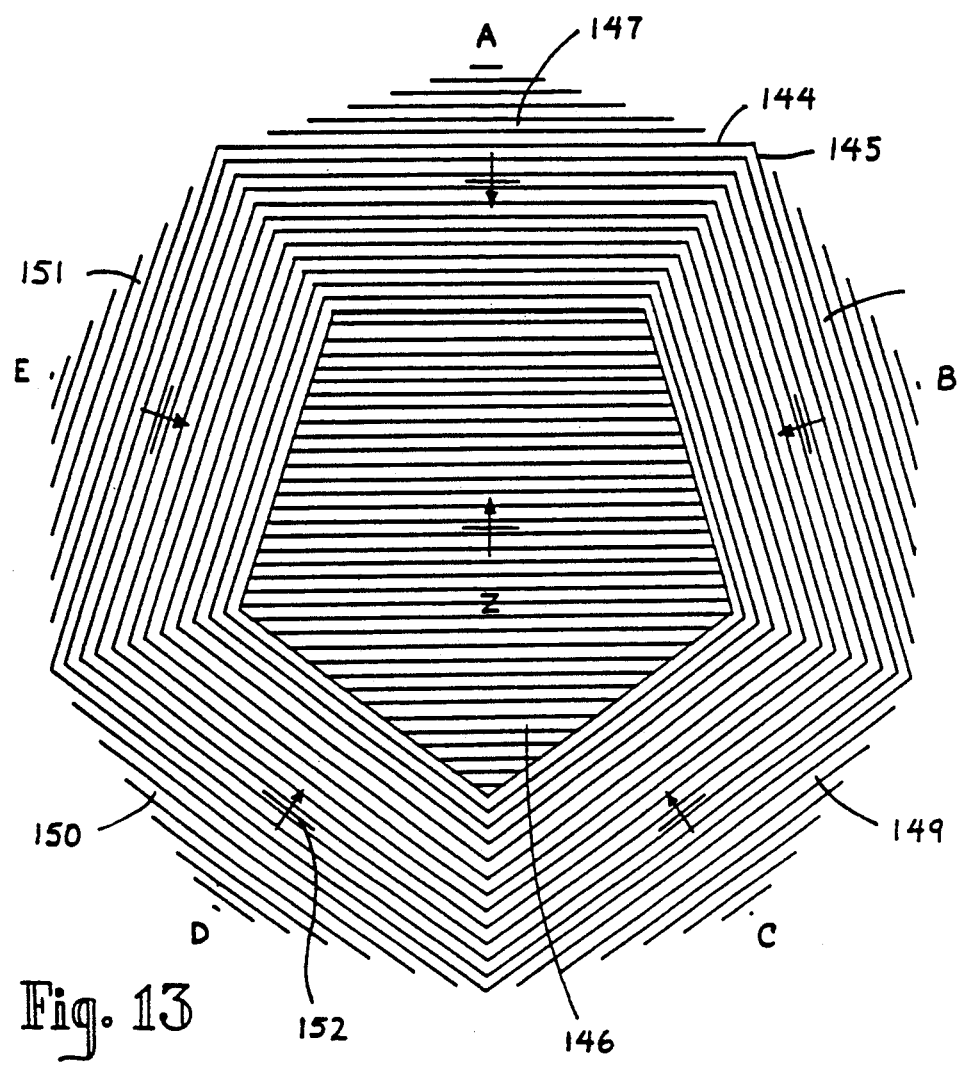
FIG. 13 is a schematic illustration from within half of a dodecahedron, showing the relationship of projected video scan lines between its pentagonal sections.

FIG. 13 shows the alignment of video scan lines 144 and 145 for the adjacent screens of an above-the-horizon hemispherical projection. The view here is straight upward from the projector, with the screens shown as flat facets. When projected on a curved surface, the lines from the peripheral screens would be curved as well, and apparently continuous. The screens can be named, starting with the zenith screen at 146 as Z. The screen adjacent to its top edge at 147 is A, then the others are named in a clockwise sequence at 148 as B, at 149 as C, at 150 as D and at 151 as E. The orientation of the picture formed by each camera module is shown by an arrow 152 within each screen, pointing to the top edge of the picture. Note that the "tops" of pictures Z and A are opposite each other. The video scan lines within each screen travel from top to bottom. For a 1000-line HDTV video projector, this would mean picture information from line 1 to line 904. If the optical axes of both the camera and the projector are properly oriented to the faces of a dodecahedron, then these scan lines should match from side to side, forming an apparently continuous picture. Given a dome with a diameter of 30 m (97.5'), and a radius of 15 m (45.75'), each screen would have a height of 15.96 m (48.678'), which yields a vertical height for each scan line on the screen of 1.765 cm (0.695").

The overall resolution of such a system can be judged by comparing it to existing film formats. HDTV's 1000-line picture is usually described as being roughly comparable in apparent resolution to 35 mm motion picture film. Thus a six-camera six-projector system to cover a hemisphere would have photographic resolution equal to 70 mm 7-perf film with a projection aperture of 48.565 mm (1.912")×30.963 mm (1.219"), better than theatrical 70 mm theatrical systems, which use only 5 perfs.

Figure 14:
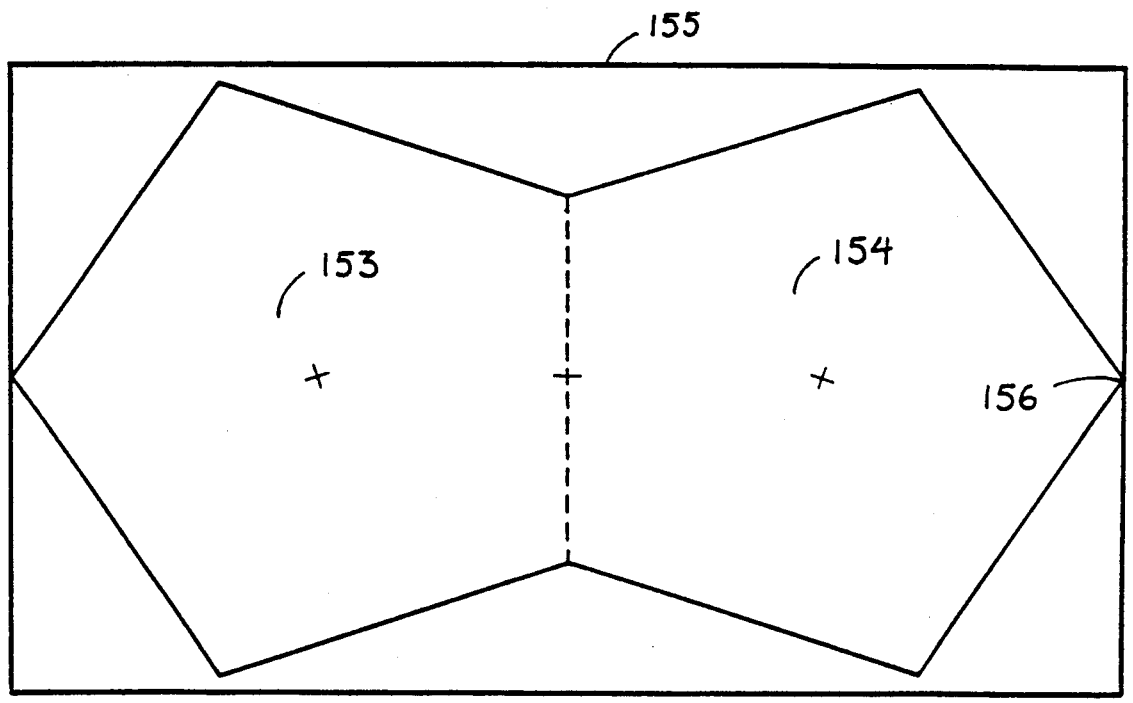
FIG. 14 is an illustration of one alternate method of dividing a film or video image into two pentagons made possible by an electro-optical lens.

FIG. 14 is an illustration of an alternate method of dividing a film or video image into pentagons made possible by an electro-optical lens, where, for every camera module but the zenith, two pentagons 153 and 154 can be extracted from original photography with an aspect ratio of 1:1.77 or wider. The format shown 155 is equal to the aspect ratio of HDTV; note that it is exactly wide enough to fit two pentagons, with the side pentagonal tip 156 bisecting the side rectangular edge.

The challenge of this method of extracting pentagonal pictures, however, is the task of making the two sides match optically. The field of view involved for the camera lens would be a very wide 140 degrees. In this case, the recess for the lens in each module face should be made broad and shallow, to match this angle. At such a wide field of view, there is usually distortion which increases concentrically from the optical center. And if there is concentric distortion, then a view to the right of the optical center from one camera module would not match a view to the left of the optical center from an adjacent camera module. The constraints of lens manufacture mean that optical means alone could not produce the radical transformation of distortion according sharp boundaries which would be needed.

The solution is a novel form of electronic assistance to the optical lens image, using distortion of the video raster scan, here called an electro-optical lens.

Figure 15:
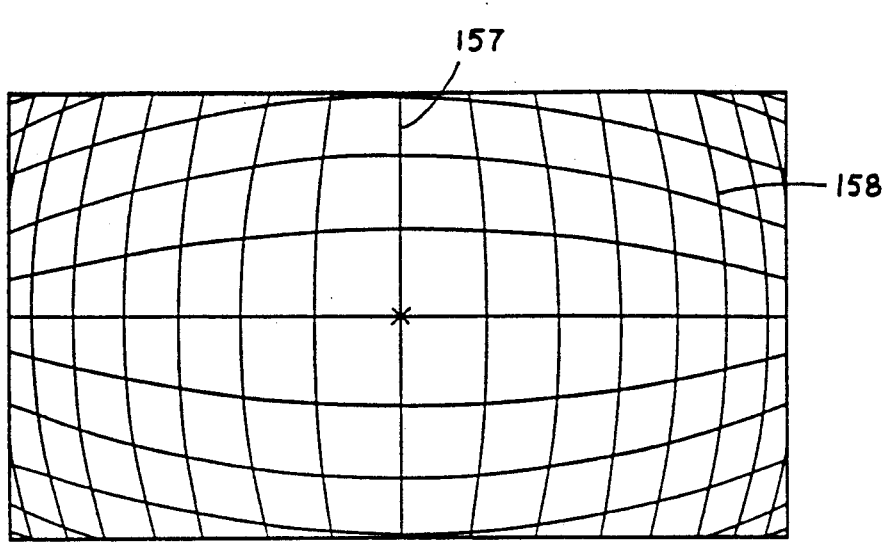
FIG. 15 is a schematic diagram showing a barrel distortion pattern in an optical lens.

FIG. 15 is a schematic diagram of a grid 157 exhibiting a barrel distortion pattern 158 caused by an optical lens.

Figure 16:
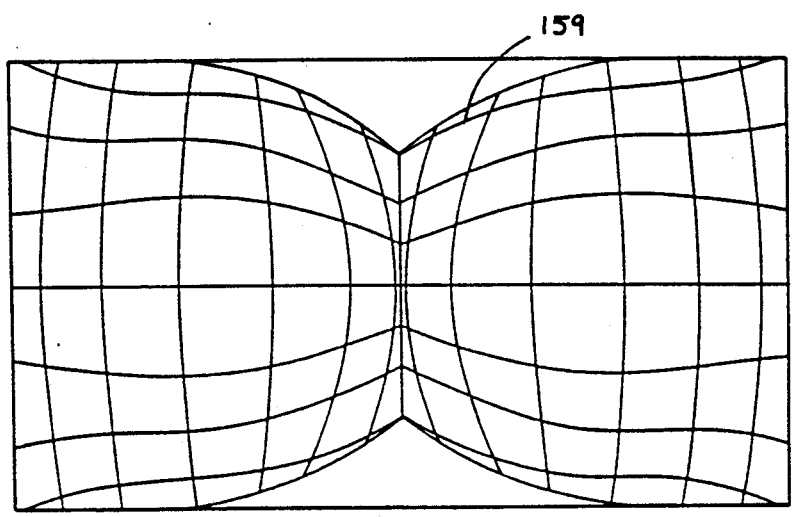
FIG. 16 is a schematic diagram of dual counter-distortion of the video raster scan in an electro-optical lens.

FIG. 16 is a schematic diagram of one example of an electro-optical lens' special electronic counter-distortion of the video raster scan 159.

This special distortion could be executed by the application of a sequence of analog drive voltages in a frame buffer holding the video picture information representing the optical lens image, using a read-versus-write system such as is found in the Quantel MIRAGE video effects processor, wherein a frame buffer is used to store the information pattern for a video frame, this information pattern is distorted, and the distorted pattern is then rescanned and written out using a normal straight-across raster scan. This special distortion could also be accomplished directly in the camera module through the application of this pattern of drive voltages to the CCD pixel scan control unit 87, producing distortion in the ordering of the readout of these picture units. With this electro-optical lens, the right and left halves would both thereby be made optically congruent.

Figure 17:
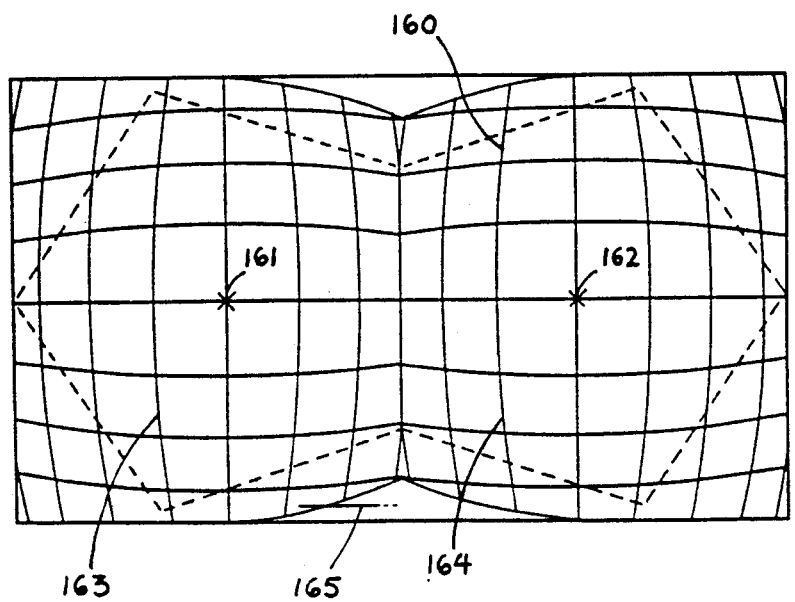
FIG. 17 is a schematic diagram of the final distortion pattern produced by the electro-optical lens, with the effect of a lens with more than one optical center, here equal to the centers of the two pentagons of FIG. 14.

FIG. 17 is a schematic diagram of the final distortion pattern 160 produced by the electro-optical lens, created by applying the above special electronic distortion to the optical image, producing the effect of a lens with two optical centers at 161 and 162, equal to the centers of the left and right dual pentagons of FIG. 14, and distortion patterns 163 and 164 which are congruent.

One advantage of the use of an electro-optical lens to produce dual pentagonal pictures from the original photography is that one camera module could produce two pictures, so the total number of camera modules required for complete coverage could be halved. The number of video recorders would be halved as well, since each will be recording two pictures, side by side.

Figure 29:
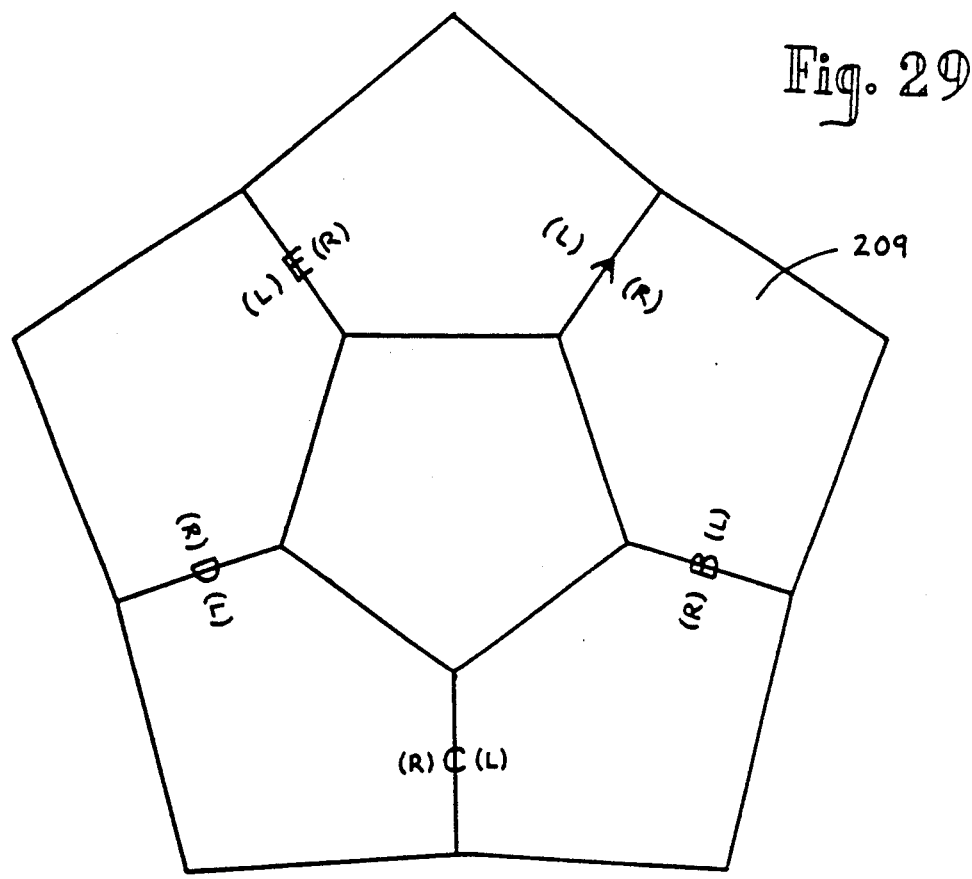
FIG. 29 is a diagram showing all of the screens contiguously through slight polar distortion, and also showing an overlapping arrangement of dual screens.

Another advantage is that given the same number of camera modules as before, and projection modules that can each display a field of view as wide as that of their respective camera modules, pentagonal pictures could be made to overlap, so each pentagonal screen, would have twice the resolution because of double coverage. The overlapping images would match because of the congruent optics created by the electro-optical lens. An organization of these overlapping pictures is shown in FIG. 29. This increased resolution would give this video system the equivalent of 12.6 perf 70 mm film, approaching the resolution of the largest film format, 15-perf 70 mm IMAX and OMNIMAX.

The two overlapping pictures for each screen could be also be used for 3-D effects, such as with differing filtration or polarization between the camera modules, or, for a 3-D effect without glasses, showing one version of the picture slightly smaller and out of focus relative to the other. Spatial separation is achieved because each of the overlapping screens is taken from a different camera module, and hence a slightly different point of view. The number of projection modules would remain the same as the number of camera modules, since each projection module would be projecting the two side-by-side pictures produced by the electro-optical lens.

Note that the video scan lines, the direction of which is indicated by the sample line at 165, are parallel to the top and bottom edges of the original photography, and are here are not parallel to the top edge of the pentagon, as in FIG. 12. This means that the video scan lines of two superimposed pictures would be tilted at an angle of 36 degrees relative to each other. These offset scan lines could also be used to separate the superimposed pictures for 3-D effects, such as by the use of two levels of screen, each sensitive to only one scan line angle.

FIG. 18 is a summary diagram of the present invention, an illustration of dual HDTV pentagonal images from an electro-optical lens in a dodecahedral mount, projected with additional cropping by a masking processor. The optical axis of the left dual pentagon is shown at 166, and for the right dual pentagon at 167. At 168 is shown a picture with an aspect ratio equal to HDTV, as projected onto a spherical field of view 169, as photographed or projected by a dodecahedral camera or projector 170. Note that with an electro-optic lens, the optical center of the original photography 141 is perpendicular to a dodecahedral edge, midway between the dual pentagons, rather than perpendicular to the center of the dodecahedral pentagonal face 49.

Pentagonal borders enforced by a masking processor are shown at 66. Further masking is also shown for creating overall non-pentagonal screens, including display of one or more portions of a pentagon at 68, display of an area outside the pentagon at 69 for use when the adjacent screen area is inactive, and display of a portion contiguous to a border 70, either by itself or in combination with another pentagonal screen 71 to create a non-pentagonal overall composite image.

Figure 19:
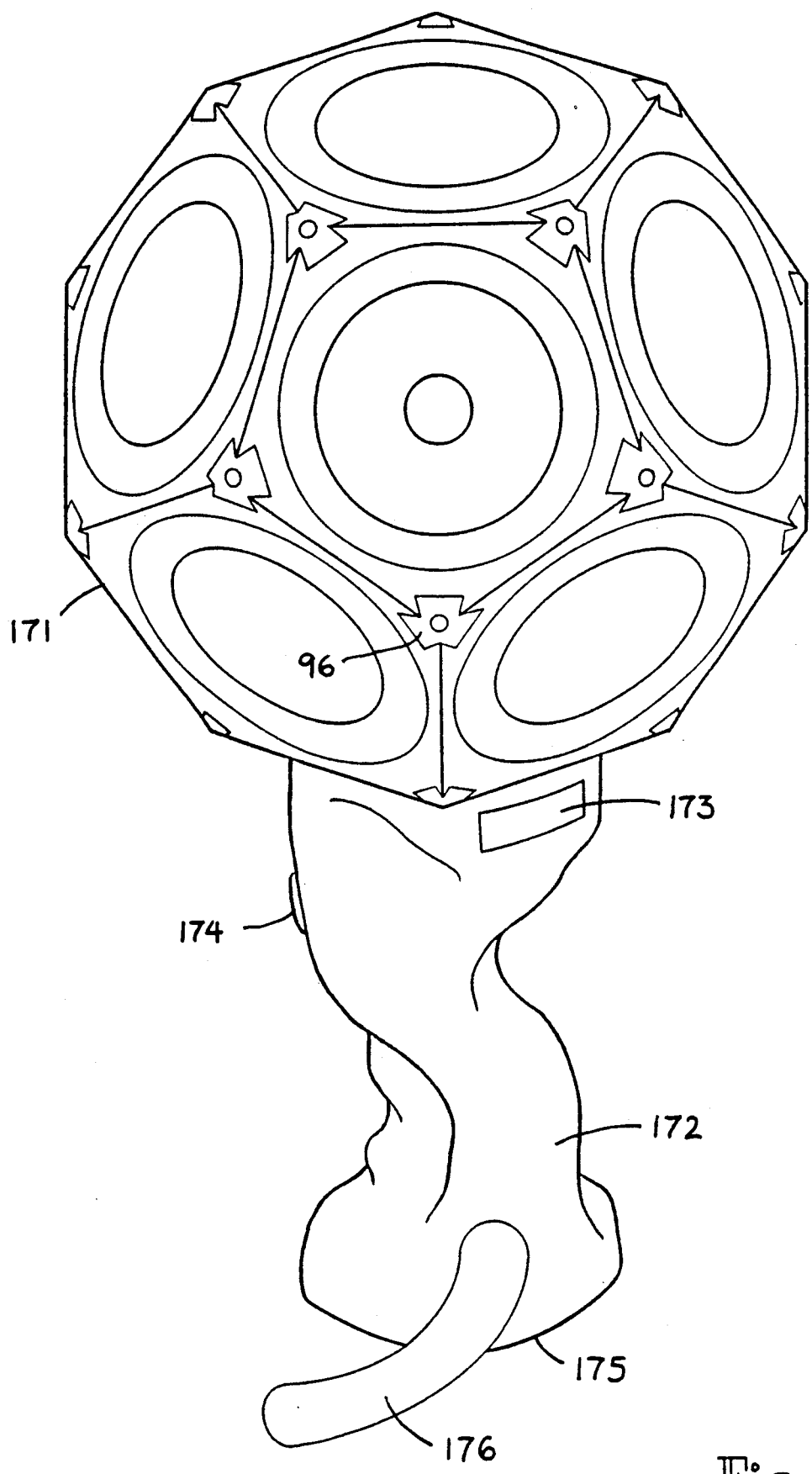
FIG. 19 is a perspective view of a portable compound video camera with a contour grip, capable of covering nearly a spherical field of view.

FIG. 19 is a perspective view of a portable compound video camera with eleven modules and a contour grip, capable of covering nearly a spherical field of view.

If each module generates dual views due to the use of electro-optical lenses, then every module but the zenith actually is aligned to a dodecahedral edge, instead of to the center of a face. This is the equivalent of a simple polar rotation of this inner camera dodecahedron by 36 degrees relative to the outer screen/field of view dodecahedron. The angle of elevation of the optical axes should also be raised from 26.565054° to 31.717473°.

The cables leading out of the assembled camera modules 171 are contained in a contour grip 172 for the camera operator containing an exposure level indicator 173 and the trigger 174. A camera tripod mount 175 can be attached to the bottom of this grip, and the cables exit from the side of it at 176. The camera modules are locked together by means of dog connectors 96. A maximum of eleven modules can be grouped together in this way, covering 91.6% of the total spherical field of view.

Given a focal length of 10.5 mm, and a camera module construction as described above in FIG. 5 and FIG. 6, each camera module would measure approximately 6 cm (2.36") in depth, and twelve camera modules together would form a sphere 15.5 cm (6") in diameter, not including the camera support. This size is easily portable by a single camera operator.

The distance between the lens axes in such a camera would also be roughly 6 cm, equivalent to the average distance between the pupils of human eyes. This intra-ocular distance between lenses means that stereo images produced by this camera would have a natural three-dimensional quality. With each lens being electro-optical and used to create overlapping images, such a camera would therefore be capable of realistic, nearly omnidirectional stereoscopic photography.

Figure 20:
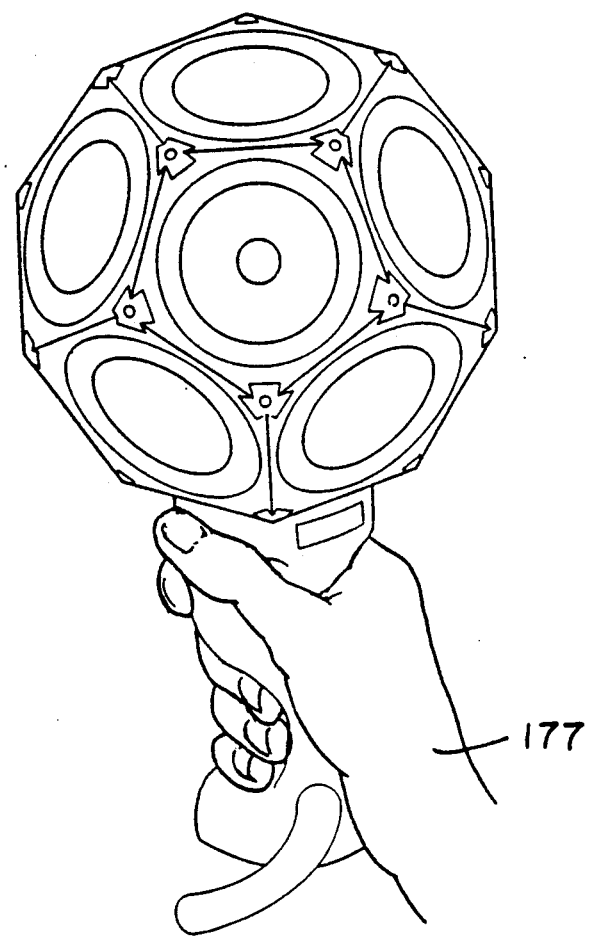
FIG. 20 is a perspective view of a hand holding this portable compound video camera.

FIG. 20 is a perspective view of a hand 177 holding this portable compound video camera by its contour grip. The space where the module pointing straight down would go is reserved for the camera mount, and for the cables in and out of the compound camera. But if the cables to and from the modules are connected to the front faces of the modules, up to twelve modules can be linked together, covering an entire spherical field of view. However, because of the necessity for a projector support, not all of a sphere can be displayed. Also, it may be desirable that the camera operator remain out of the picture, so a smaller number of modules could be used for a smaller overall image.

Figure 21:
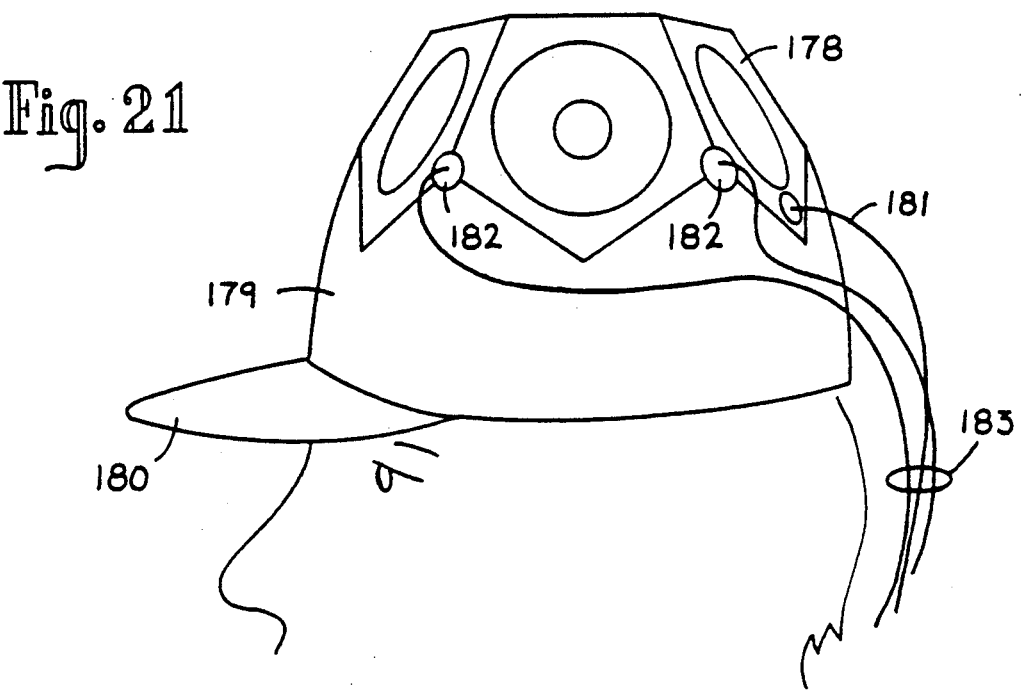
FIG. 21 is a perspective view of a portable compound video camera helmet capable of covering a hemispherical field of view.

FIG. 21 is a perspective view of a portable compound video camera, mounted on a helmet, capable of covering a hemispherical field of view. This shows the usual number of six assembled camera modules 178 to cover a complete hemisphere. A helmet 179 supports this arrangement, and contains space for the support electronics. It also has the advantage of placing the camera operator underneath and thus out of the panoramic picture, and allowing the camera arrangement to be carried comfortably for long stretches of time, with readouts including exposure, focus and elapsed time displayed on the inside of the brim 180. The cables from the camera modules are shown emerging from connectors on their exterior face 181 and from channels to the inside at the pentagonal points 182 (assuming a means for attaching the modules together other than at the corners). These cables carrying the video signals from the camera 183 go out to a recording device, either separate or carried by the operator, or directly to the projection system.

Figure 22:
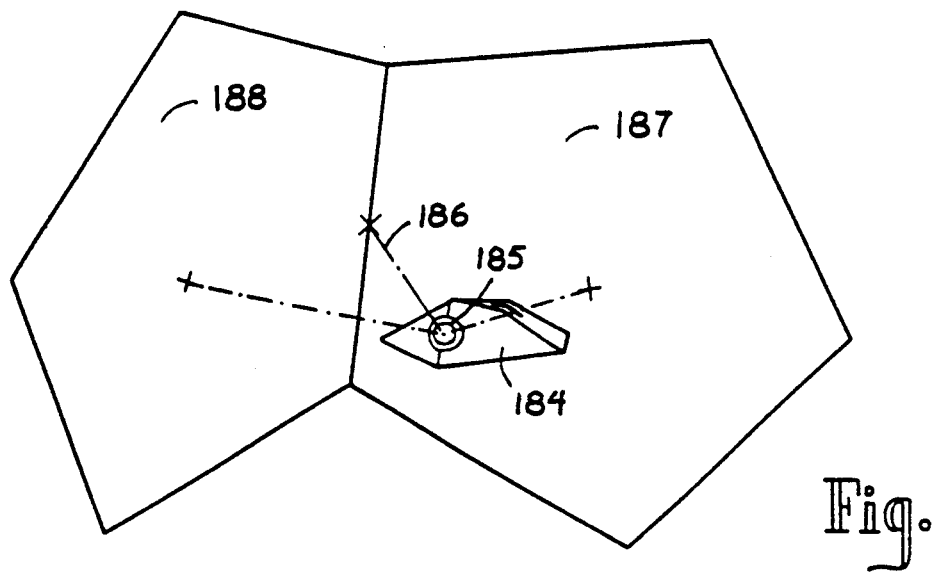
FIG. 22 is an illustration of a camera or projector with three lenses oriented to the edges of a dodecahedron, with each lens capable of covering two screens, thereby covering an entire hemispherical field of view with single resolution.

FIG. 22 is an illustration of a camera 184 with three electro-optical lenses, each lens 185 having an axis 186 oriented to the center of an edge of a dodecahedron, and each capable of covering two screens 187 and 188, thereby covering an entire hemispherical field of view of six screens with single resolution. Only three recorders are needed, because each can record two screens. Note that the top-oriented module is different in shape than the side-oriented camera modules.

Figure 23:
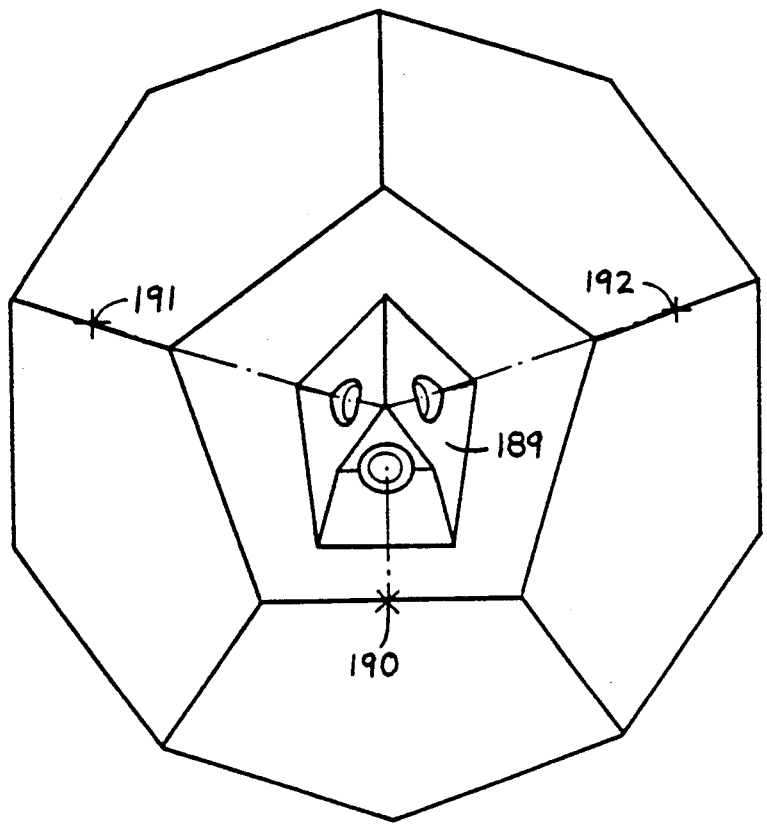
FIG. 23 is an illustration of a top view of this edge-oriented camera or projector, showing its arrangement of dual screens for covering a hemispherical field of view.

FIG. 23 is an illustration of a top view 189 of this edge-oriented camera, showing its arrangement of dual screens for covering a hemispherical field of view, and showing the top edge target for orientation 190, as well as the left side edge target 191 and the right edge target 192. The angle of elevation for the side edge targets is 31°, 43′, 2.9028″ (31.717473°) and to the top edge target is 58°, 16′, 57.0972″ (58.282527°).

Figure 24:
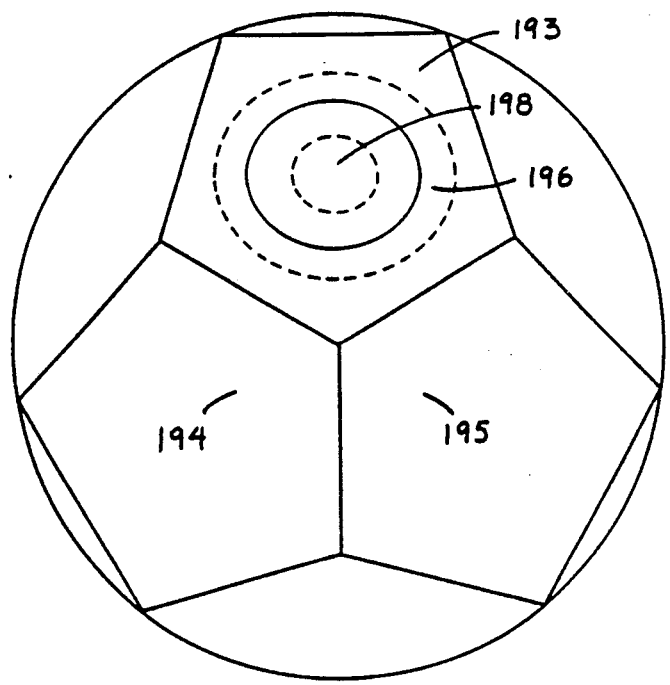
FIG. 24 is an illustration of the extraction of three screens from the optimum lens image by an electro-optical lens.

FIG. 24 is an illustration of the extraction of three screens from the optimum lens image by an electro-optical lens. The three screens are shown here with slight polar distortion to make their edges contiguous. Instead of the optical center of the original photography being on a dodecahedral edge, midway between the dual pentagonal screens, as in FIG. 14 and the edge-oriented dual-screen camera system described above, this method of division orients the optical center to a dodecahedral vertex, so that three screens are extracted, the zenith screen 193, the left side screen 194 and the right side screen 195. Each individual screen is made optically congruent with the others, as shown for dual screens in FIG. 17.

By the use of a vertex-based hemispherical camera system, with each of five cameras producing three screens, all of the side pentagons would receive double coverage, and the zenith pentagon would be covered by five overlapping screens. However, because the vertical height of the video raster scan, equal to the height of the optimum lens image circle, is divided into two pentagon levels instead of one, as in FIG. 14, each pentagon in a triple system would have only half of the resolution of a dual system, so the double coverage of the side screens, while producing separate image layers that could be used for three-dimensional effects, would have only the same resolution as regular photography. The zenith screen, on the other hand, because of its five overlapping screens, would have two and a half time normal resolution. Projecting all three pentagons in an overlapping arrangement also depends on a projection module that also has this wide field of view, and is aligned as well to the vertex, meaning that it would have to have the same pyramidical structure as the camera.

The overlapping zenith screens could be shown, through the use of the masking processor, as concentric discs of progressively smaller sizes 196, with soft edges, to gradually build up resolution toward the center. Within the border of a displayed image 197 would be one or more regions of reduced brightness, 198, where the light level of the images would be adjusted to prevent luminance buildup from succeeding overlapping images. This method of increased resolution in the center matches the increased resolution found in the center of human vision, and would serve to improve the quality of the overall presentation.

Figure 25:
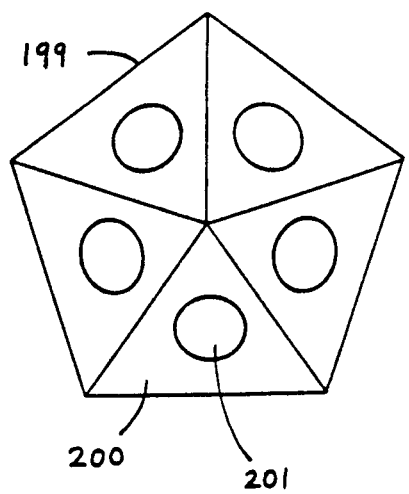
FIG. 25 is an illustration of a top view of a dodecahedral vertex-based compound camera or projector for a hemispherical view.

FIG. 25 is an illustration of a top view of a dodecahedral vertex-oriented compound camera 199 for a hemispherical view. It is in the shape of a flat pyramid of five modules or facets, each facet 200 holding an electro-optical lens 201 with a field of view of at least 152 degrees. The face of each facet has a slope of 37°, 22′, 38.5536″ (37.377376°) and an angle of elevation for the central axis of the lens of 52°, 37′, 21.4464″ (52.622624°).

Figure 26:
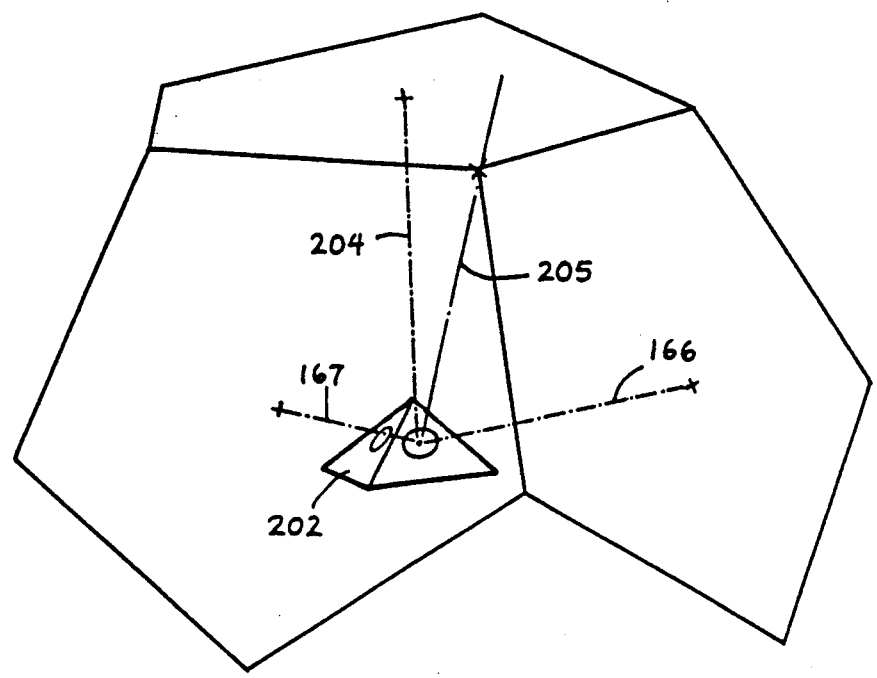
FIG. 26 is a perspective view of a vertex-based camera or projector system, showing the three screens covered by one camera or projector facet.

FIG. 26 is a perspective view of a vertex-oriented camera 202, showing the three screens covered by one camera facet. At 203 is the central axis of the facet, which is aligned to a dodecahedral vertex, and at 204, 166 and 167 are the three optical axes of the three separate screens with congruent optics produced by the electro-optical lens.

Figure 27:
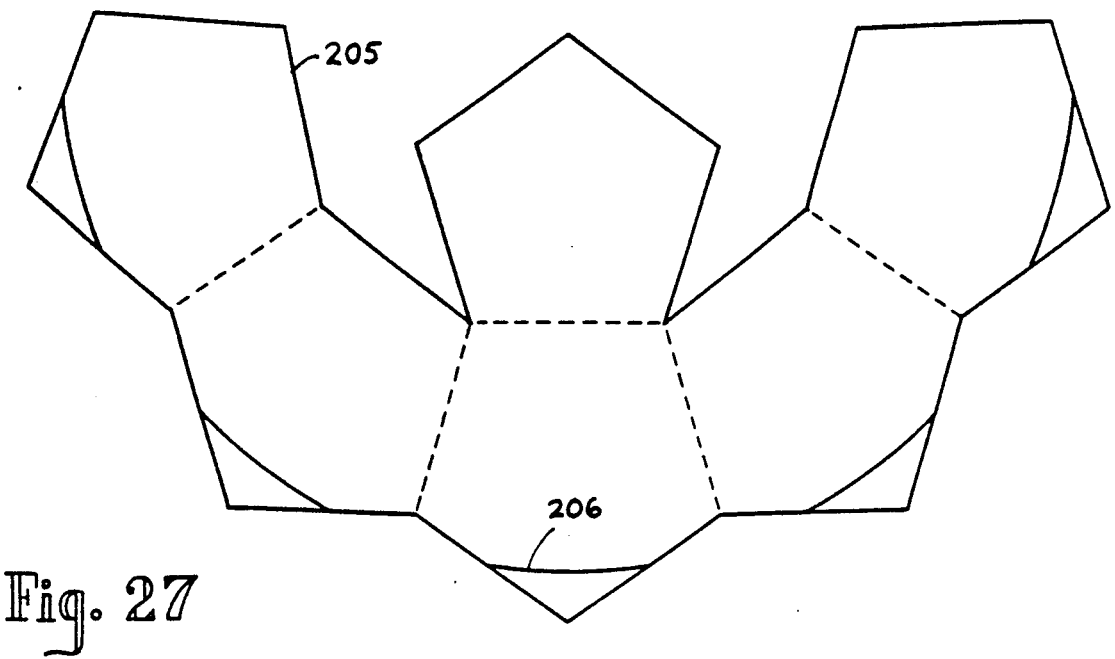
FIG. 27 is a diagram of a layout of pentagons for planning artwork and images for hemispherical photography and projection.

FIG. 27 shows an illustration of a guide for planning artwork to be photographed for a dodecahedral mosaic. The outline of an individual flat screen is shown at 205, with the horizon line shown at 206. This guide is useful for drawing freely across sections along the horizon, with the assurance that the pentagonal screens will match. If this guide is used for doing animation artwork, it could be shot with a motion control animation camera that can rotate and move to shoot each section in succession. Preferably the camera should move, to maintain the same orientation of the lights to the artwork throughout. This would produce a film strip in which the six screens would be shown in succession for each frame of the motion. Transfer of this film to six separate recordings, to allow simultaneous showing of the six screens, would take place through step printing on either an optical printer or a film-to-tape transfer machine.

Figure 28:
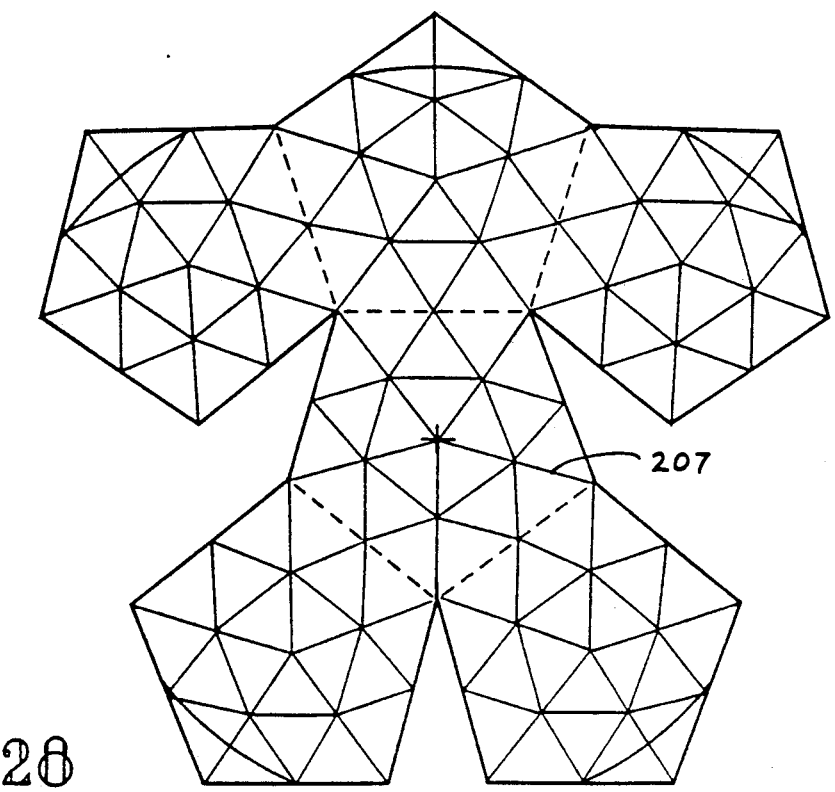
FIG. 28 is a diagram of an alternate layout of pentagons for planning artwork, showing a geodesic grid.

FIG. 28 shows an illustration of another type of guide for planning artwork for a dodecahedral mosaic, showing a geodesic grid on each screen at 207. This type of guide is more accurate, because it shows correct proportions and the lines that define great circle routes in every direction. However, its unusual geometry can take some getting used to, and care must be taken for sections that are separated to make sure that the artwork matches along the edges.

FIG. 29 is a diagram showing all of the screens together contiguously, through slight polar distortion, and also showing an overlapping arrangement of screens from a dual electro-optical lens. This arrangement of the screens 208 can be accomplished by a linear progression of polar distortion up to 16.666%, from the bottom to the top of each outside pentagon, yielding an outside pentagon shape shown at 209. Despite its slight disproportion, this guide can be very useful, because it maintains the height of the outside screens, and shows all their edges matching. Therefore it is the most proportionally correct way to display the image created by the six pentagonal screens as a flat image, and it is also the best way to divide up an existing flat image so it may be displayed on the six screens. In this manner, a large overall shape may be sectioned for assignment to the individual masking processors for each screen.

Also in this figure the arrangement of overlapping screens from a dual electro-optical lens is shown, with the left and right screens produced by each module. Note that the central axis of each module in a dual-screen system is opposite a dodecahedral edge. Also note that because of the structure of the dodecahedron, the zenith pentagon cannot be double-covered in a dual-screen system except by an extra single camera.

Figure 30:
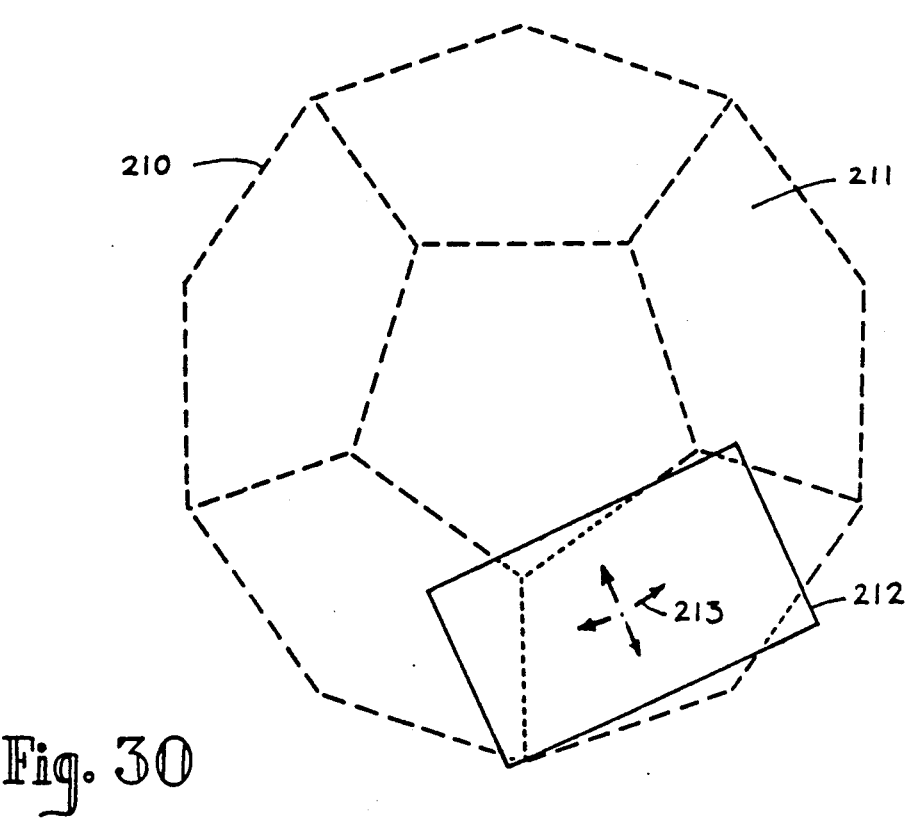
FIG. 30 is a diagram of a virtual image of six screens, shaped into a disc, and used in a rotating electronic viewfinder system capable of covering a hemispherical view.

FIG. 30 is a diagram of a virtual image 210 of six screens, shaped into a disc, and used in a rotating electronic viewfinder system capable of covering a hemispherical view. This uses the screen proportion of FIG. 30, with further compression by 79.2% of the outside pentagons from their centers to their outside tips to make the outline shown at 211. Although this gives the horizon line on each screen an upward bend in the middle, it makes the arrangement of screens more suitable for an overall rotary electronic viewfinder. The picture information in the screens is held in a virtual memory, preferably in low resolution in a computer to allow real-time operation, with individual segments from linked playback machines or from the camera modules themselves. The window of the viewfinder 212 is a frame buffer which calls upon picture information from the virtual memory as needed. The directions of motion of this window 213 are controlled by a joystick, whose vertical movement brings the window to the zenith, and whose horizontal movement causes rotation around the central point, so that the scene pans by along the horizon line. If possible, further controls can expand and compress the size of this window as needed.

Figure 31:
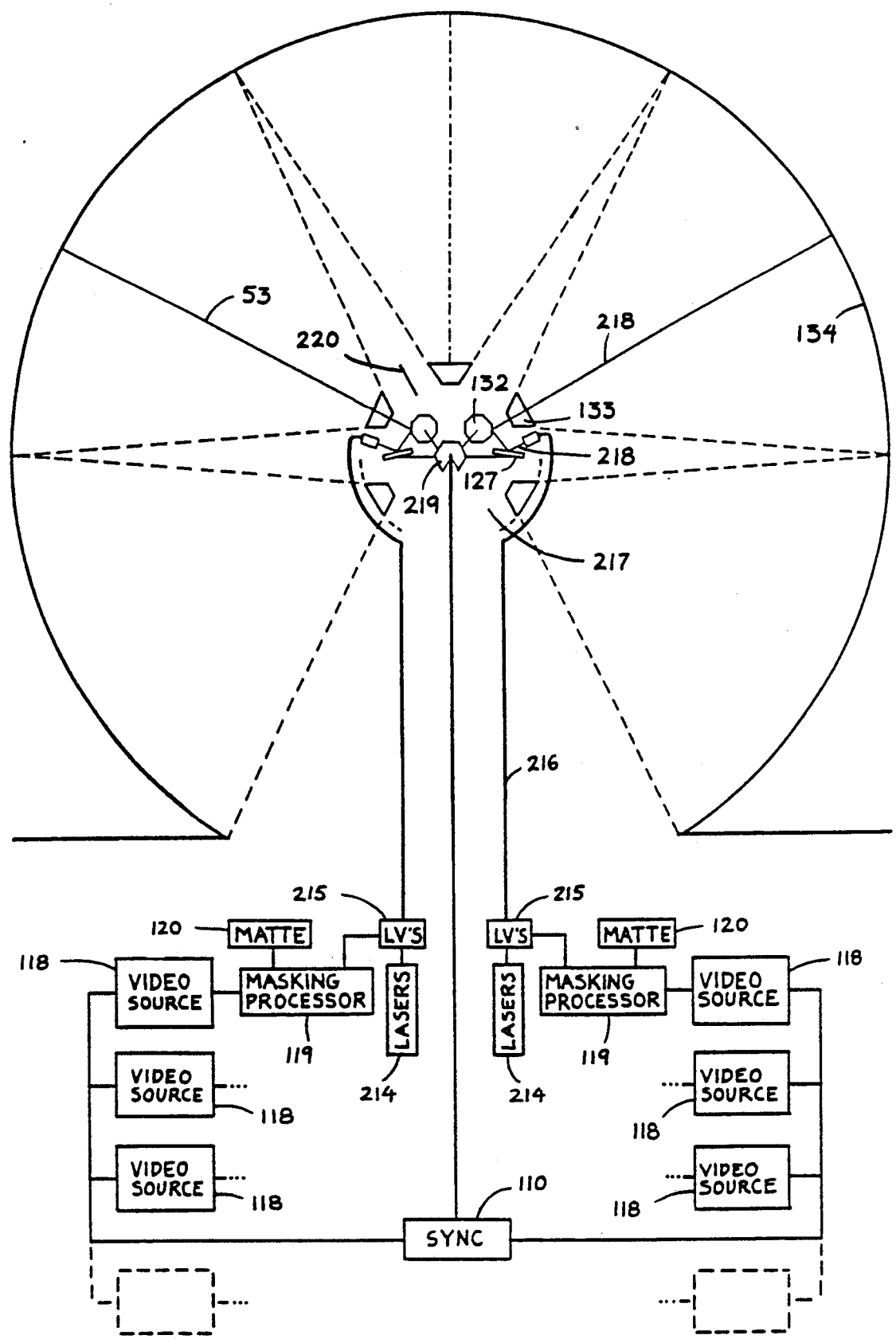
FIG. 31 is a schematic illustration showing a cross section of a theatrical projection system using laser video projection.

FIG. 31 is a schematic illustration showing a cross section of a theatrical projection system using laser video projection. As shown in FIG. 3, cross sections of a dodecahedron are asymmetrical. Here, for the sake of clarity, the components in this view have been made to lie along the cross sectional plane, as if there were six projectors around the periphery instead of five. Six modules are shown, but a total of eleven can be used in the projection system, with the added modules shown with a dashed outline, to give the maximum area coverage.

The video source is at 118, either a video recorder or a camera module. The video signal goes through a masking processor 119 to mask out all but the central pentagonal part of the image, or other portions of the image, as described above. By using this processor in combination with the processors of other projector modules, non-pentagonal overall screens can be displayed, in a variety of shapes and sizes.

Three light beams are emitted in red, green and blue. In the preferred embodiment, these light beams are laser beams. Other light sources can be used, such as are found in other types of video projectors. But for this discussion, laser beams will be assumed. A group of three lasers at 214 output red, green and blue laser beams. The signals representing the red, green and blue color information of the video signal are used to control a group of three light valves at 215 for these laser beams, regulating the amount of red, green and blue light that is combined, in the preferred embodiment, into a white light beam that passes through a fiber optic cable 216 connected to the outside face of a projector module in the projection head at 217. There the white laser beam 218 is reflected from a mirror 127 for the vertical scanning, and a spinning mirror wheel 132 for the horizontal scanning, thereby forming a video raster scan. These and the other mirrors for the other modules for the projector are kept in synchronization by a house video sync generator 110, connected to the various modules via a distribution amplifier 219. The reflected laser beam passes through a projection lens 133 and onto a projection surface 134 with a spherical curvature. Because of the infinite depth of focus of a laser, this projection surface could be ovoid or have some other curvature, but the such a projected image would not be an undistorted reproduction of the view of the camera.

The optical axis 53 of each projection module is perpendicular to one of the faces of a dodecahedron if a single screen is being projected, or aligned to an dodechaedral edge for an overlapping double screen projection, or to a vertex for an overlapping triple screen projection. The angle of view of each projection lens matches its respective lens in the camera system.

Each module of the the projector is enclosed in a baffle 220 to cut down on light leakage from one module into another. Additional modules, up to a total of eleven, may be added for photography below the horizon, shown here with dotted lines, as described earlier for the camera system, for a maximum field of view of 91.6% of a sphere. The only limitations are the need to allow space for the projector support, and for space for the audience inside the sphere where, for safety reasons, the laser-projected pictures do not fall. This is to prevent damage to the eyes from an audience member looking into the laser beams coming from the projector.

A projection surface should minimize angular reflection that would tend to wash out adjacent images. A grey surface could be used, or a porous white one that has holes to allow sound to come through from speakers behind the screen. The screen material should be applied in geodesic sections. A lenticular projection screen material would also be useful in cutting down the scattering of projected light. However, the more directionally reflective the screen, the more the image would disappear when viewed at an increasing angle away from the optical axis.

If the centers of each face of a dodecahedron are connected, an icosahedron is formed, which is the basis for R. Buckminster Fuller's geodesic dome construction system. Thus this dodecahedral projection system is harmonious with geodesic dome construction, and the boundaries of screens, structural members for suspending a projection surface, and supports for the placement of speakers all match the construction elements of a typical geodesic dome. If a porous projection screen is used, then sound can come out through it, and the struts and members of the geodesic dome support would act as acoustic traps to minimize internal sound reflection within the dome.

If the audience is outside of the spherical projection surface 134, looking at a rear-projected image on a translucent screen, looking into a projector is not a problem, because the screen is between them and the projector. The image could then be very bright, depending on the translucency of the screen, and a full sphere can be displayed. However, a viewer could not see all of the view at once, as would be visible inside by turning the head, and the perspective of the view would appear distorted. Projection with the audience outside would be best for special purposes, such as displaying a complete image of the Earth.

Figure 32:
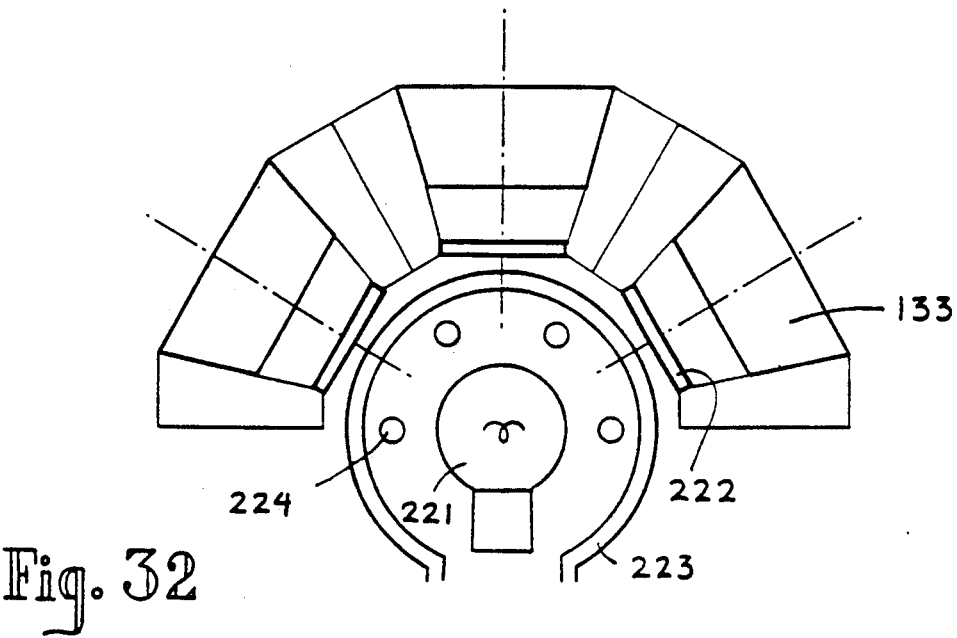
FIG. 32 is an illustration showing a cross-section of a compound projector using liquid crystal display panels, a theatrical light source and two types of cooling systems.

FIG. 32 is an illustration showing a cross-section of a compound projector using Liquid Crystal Display (LCD) panels, a theatrical light source and two types of cooling systems.

LCD projection involves the use of a theatrical projection lamp 221, such as a high-output xenon, krypton or tungsten halogen, to produce a strong white light. An LCD panel 222 in each projection module displays the color video signal, and acts as an active transparency, blocking or passing the light as needed to make a picture, thereby controlling the amount of light passing through strategically placed blue, green and red stripes or filters on the surface of the LCD panel, with the colors passing through the projection lens 133 and combining at the screen. JVC and Panasonic are developing such projectors, and Sharp has demonstrated the XV-100 LCD video projector capable of projecting a 100-inch (2.54 m) picture.

An LCD projector for the present invention may require only a small number of projection lamps, perhaps only one, to be behind the LCD panels, and does not require the LCD's to be of extraordinary size, as long as they have a good amount of resolution. Because of the simplicity of the design, its lower power requirements, and because it would be brighter than a laser projector, LCD projection is the second choice as a preferred embodiment. The major drawbacks to the system are the constraints on resolution in such an LCD panel, the scattering of light between modules due to internal reflections off the LCD panel facets, and the heat generated by a powerful projection lamp, especially as it affects the topmost projection module and the alignment of the others. Denser LCD's with more pixels or combinations of multiple LCD's would improve resolution, opaque walls between the projection modules would prevent light scatter, and for cooling, a transparent, glass-walled barrier filled with circulating water 223 between the light and the LCD, such as is used at present to protect the film in certain film optical printers, could be used, augmented if necessary by cooling pipes for supercooled gas 224, such as liquid nitrogen, outside the projected image area.

Figure 33:
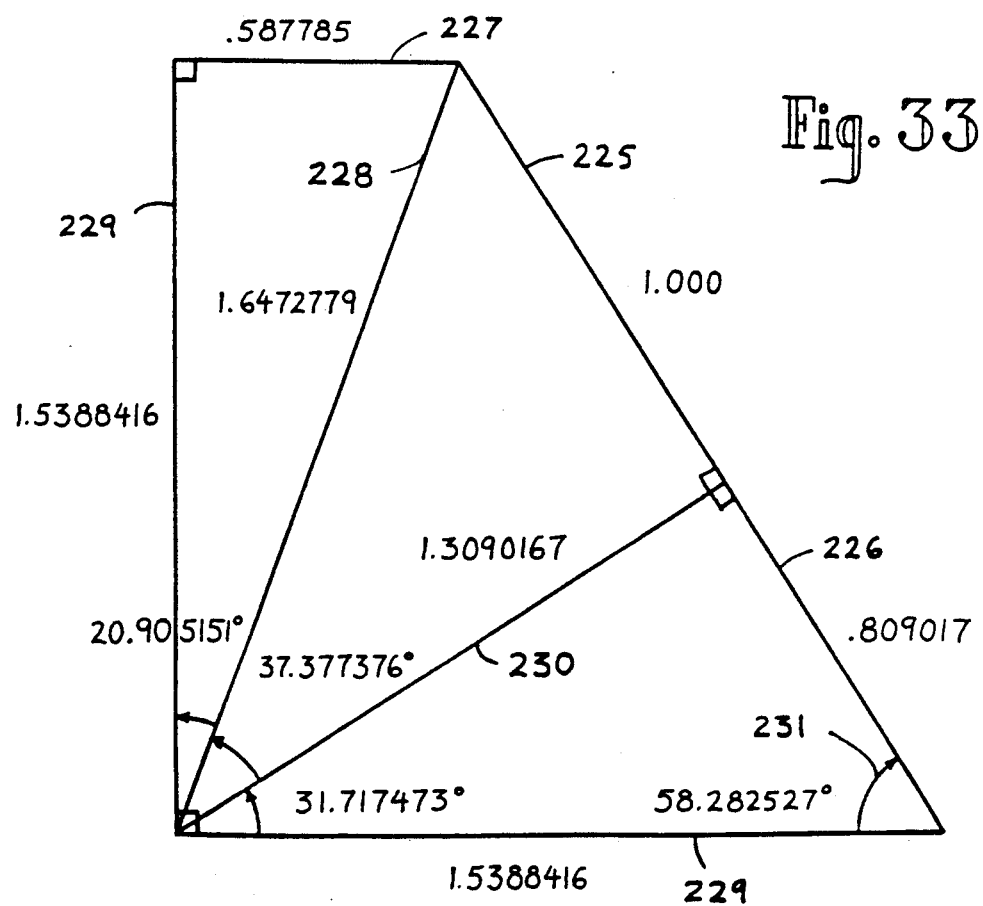
FIG. 33 is a quarter-section showing the characteristic angles and proportions of the dodecahedron.

FIG. 33 shows a quarter section of a dodecahedron, drawn according to a plane running between D, E and F of FIG. 1. This figure shows the characteristic angles and proportions of the dodecahedron. The proportions of the exterior and interior measurements are shown, according to 1.00 being the radius of the pentagonal faces. This radius is shown at 225. The altitude of a pentagonal section from the middle of an edge to the center is 0.807017, shown at 226, and one-half of a dodecahedral edge is 0.587785, shown at 227. The length of the radius of the circumsphere of the dodecahedron, which touches all of its outermost points, is 1.647779, shown at 228; the intersphere, which bisects its edges, is 1.5388416 shown at 229; and the insphere, which touches the centers of its faces, is 1.3090167 shown at 230. One-half of the 116.565054' dihedral angle between dodecahedral faces is shown at 231. The interior angles are also shown; between the center of an edge and a pentagonal point, 20.905151', is shown at 232, between a point and a pentagonal center, 37.377376', is shown at 233, and between a pentagonal center and a pentagonal base, 31.717473', is shown at 234.

This completes a basic description of the present invention as a video system.

Using the principle of pentagonal pictures in a dodecahedal arrangement, other variations are also possible. For example, variations on the geometry of the dodecahedron may be used, and different types of image recording and projecting apparatus may be employed within the context of the present invention. Accordingly, the scope of the invention should be determined not by the embodiments illustrated, but by the appended claims and their legal equivalents.

If two basic pentagonal picture shapes, instead of just one, can be assumed, then if the zenith and base pentagons are made larger, then the standard shape for the screens both above and below the horizon becomes a flattened pentagon, closer in shape to conventional rectangular screens.

Further subdivisions of the dodecahedron and the other polyhedra yield hundreds of variations of polyhedral geometry. By use of the masking processor, many interesting new shapes could be shown, such as the rhombicosadodecahedron, which has faces which are pentagons, squares and equilateral triangles. Further spatial video processors such as the Quantel ADO video effects processor and the Quantel MIRAGE video effects processor could also be used to manipulate these individual facets before projection.

Other regular polyhedrons have been described, including deltahedrons, a kind of dodecahedron made of equilateral triangles, the stellated forms, and even the Kepler-Poinsot polyhedra. However, these all require more facets for recording a complete spherical picture than the dodecahedron. But if signal bandwidth and module construction size permit, other types of polyhedral interchangable modular motion picture camera and projection systems present themselves to view.

As new technologies of image recording and projection appear, each can be applied to the principle of recording and projection described here, as long they follow the essential dodecahedral geometry.

The present invention, because it breaks the overall image into manageable pentagonal sections, is also appropriate for use with special effects. Because each section is photographed with a standard lens with a field of view of approximately 75 degrees, photography from different sources can easily be made to match especially if the decribed artwork guides are used. If the present invention is implimented as a video system, then compositing of different images is made even simpler, especially is digital video is used. Thus the combination for a dome theater of regular photography and special effects such as stop-motion animation can more easily be done, to produce vivid impressions, such as a dinosaur appearing from behind a tree in a view of the Brazilian rain forest.

An alternative method does not depend on a geodesic grid for creating artwork for pentagonal screens. For film animation above the horizon, the artwork can be created, for every part of the dome screen except the zenith, using a conventional rectangular field chart grid, then to produce pentagonal image sections that will match, each section in succession is photographed through a pentagonal mask in the camera, with the artwork on an animation table whose top has been tilted away from the film plane by 26 degrees, 34 minutes. The right and left edges of the artwork are designed to match. The animation for the zenith should be planned according to a concentric grid with radiating lines based on multiples of five, and photographed on a flat table so it will match the top edges of the other sections. When these sections are transferred to video are shown through the projection system of the present invention, they should produce a kind of continuous panoramic environment of animation. I have produced such animated scenes on 35 mm 5247 color negative film, using a 5369 soft-edged bipack matte, on a Mechanical Concepts animation stand at Lumeni Productions of Hollywood, Calif.

The small size of the video camera described here lends itself to hand-held operation, including scenes in action that would be impossible for a larger camera. However, if the need arises, larger cameras would yield improved picture quality.

Many improved techniques of video recording are currently under development, and video recorders are shrinking in size. Sony recently announced an optical HDTV video disc recorder with a two channel optical pickup. Digital recording and transmission of video recording is becoming a new standard. Magneto-optical disc (MOD) recording using a polarizing laser such as that demonstrated by France's Thomson and Japan's Canon may become the preferred means of video storage because it allows random access, and may become remarkably small and portable because it does not require tape reels and a recording drum. It is also the recording medium used by the NeXT computer, and may become the standard for the multimedia software of the future. Solid-state memory cards are also under development for storing digital video information.

The limits of recording are suggested by proposed research into three-dimensional crystal matrix recorders. The phenomenon of photon echo, where photons can be stored at precise locations in a crystal by two lasers, then released and detected using a third, may enable recording to be done three-dimensionally. A proposal to the U.S. Navy by Marc A. Friedlander describes a square array of 10,000 tiny semiconductor lasers capable of being focused within 1-micron cubical data cells in a 4" (100,000 micron) cube of cooled, rare-earth doped lanthanum trifluoride. If ultraviolet lasers could be used to shrink the data cell size to 0.1 micron, then given a proposed NEC standard bandwidth for digital video (with compact disk-quality sound) of 42 million bits per second, the capacity of such a recorder would be 754 years!

U.S. Pat. No. 3,832,565, entitled "Holographic Memory with Dodecahedron Detector Matrix", by P. Graf and M. Lang, assigned to Siemens AG, describes a device for retrieving information stored in the form of subholograms by the use of a detection matrix in the shape of a dedecahedron. In other words, the detectors surround a recording medium in the shape of a dodecahedron, looking inward. In the present invention, cameras record and projectors reproduce an outward image. For the sake of symmetry, if nothing else, this would seem to be the most appropriate means of storing and replaying the image data of the present invention, especially if each face could act as a storage and retrieval unit respective to one of the modules of the present invention, and simultaneous multiple recording and playback could be done, then it would be the preferred embodiment for recording in the present invention.

There are several possible alternative methods for the projection system in the present invention besides the described embodiment of laser video projection. The field of large-scale video projection is currently in flux, and further developments may arise to perform the function of displaying the image from the masking processor of each projection module on a spherical surface. There are two basic approaches, video projection or video display on a direct-view screen. Projection reproduces the image from the camera system onto a pentagonal screen from the inside of the dome outward, while direct-view screens reproduce the image on the pentagonal screen from the outside in. Besides the laser and LCD projection described previously, video projectors also include Cathode Ray Tube (CRT) projectors. Examples of direct-view screens include television sets and solid fiber optic domes.

In CRT projection, the next most preferred means of projection, the varying video signals for red, green and blue control the intensity of streams of electrons in cathode rays. In the more common variant, these are used to reproduce bright monochrome phosphor images on the faces of three Cathode Ray Tube (CRT) screens. The light from these screens passes through the appropriate filter and a focusing lens, and falls on the screen, froming a color video image. This is the most common type of video projector today. However, its projected image tends to be relatively dim and indistinct when applied to large screens. A successful variation of this type is the Eidophor from Gretag of Switzerland, which uses the cathode ray beams to deform thin sheets of heated oil on a concave mirror, creating variable reflectivity to deflect the light from a powerful projection lamp through mirror rods and colored filters, thereby creating a large, bright image with good resolution. Recently this company announced the model 5177, which can perform HDTV projection up to 12 m (40') wide. However, these type of projectors tend to be large and heavy, need time to heat up, and would be difficult to keep in adjustment because gravity would deform the various angles of oil sheets in different ways. This makes them unsuitable at this time for the compound projection system described here.

Direct-view methods for displaying the pictures from the projection modules would mean that no central projector would be necessary for the theater. Instead, the images would be projected from the outside of the viewing screen inward. Methods of direct-view projection systems include large-screen television sets and solid fiber optic domes. Large-screen television sets, especially by Hitachi and Mitsubishi, now have larger screens than ever before, with good quality pictures. But these sets are still limited to a roughly 1.83 m (72") diagonal. Moreover, they are not made with pentagonally-shaped screens, and the need for a blank margin area to frame the picture tube precludes them from being used for a composite system of contiguous screens.

Screens made of fiber optics offer more promise for use in a direct-view system. Advance Display Technologies of Golden, Colorado is currently offering direct-view screens for airports and stadiums made of solid bundles of rayon fibers. The bundles grow thicker as they approach the viewing surface, and terminate at an angle to make a 15.24 cm×15.24 cm (6" by 6") "shingle." These bundles or shingles are built up to make a large viewing screen for a video image projected into their other end. Excellent brightness and clarity can be achieved, with a very wide viewing angle, and the resolution is only limited by the size of the fibers. However, these screens are limited at present to heavy flat rectangular screens 2.74 m×3.65 m (9'×12') in size, and it would be difficult feat of construction to make concave screens large enough to cover a dome theater, and to assemble them with the proper alignment. Moreover, if this could be accomplished, then essentially the entire interior surface of the dome would be a solid mass of fiber optics, so it would be almost impossible to repair should one of the bundles need to be replaced. If the main fibers carrying the image could be made to multiply and branch so as to expand the image in an efficient way, in a separate fiber substructure close to the screen, then individual areas would be easier to create and repair.

However the projection system of the present invention is accomplished, its large, continuous picture will give the audience an entirely new impression not of just "watching a movie," but actually "being there," while the increased resolution and three-dimensional effects made possible by the use of an electro-optical lens will increase the believability of the projected image. In addition, the flexible shape of the overall composite picture made possible by the use of masking processors lends itself to creative variation in the service of expression of new ideas.

It will be understood that the because of its small, lightweight, portable nature, the position of the camera is highly flexible, And the assignment of one level of modules to above or below the horizon photography is a matter of convenience in description, not rule in practice.

Likewise, a spherical theater is also capable of infinite manipulation of orientation. Unlike conventional buildings, a sphere has no corners to prevent free rotation of the entire building, especially if it is built as a rigid sphere with rail guides.

Because of the small, compact size of the projection head made possible by the use of the present invention in the preferred embodiment, the projection head, on its fiber-optic stalk, is light enough be motion controlled as well, and be made independent of the plane of the seats, and free to roam the theater. Because of its infinite focus, a laser beam would always create a sharp picture regardless of its distance from the screen, and the masking processor enables splashes and fragments of images to be thrown, provided the audience is always prevented from direct exposure to the laser light. The rotation mirror wheels in the projection heads could act as gyroscopes, to automatically provide stability in motion, and a highly accurate guage of the orientation of the head.

The sound of course should be appropriate to the presentation. Sound recording as part of the camera, in the nature of existing camcorders, is assumed for the future, in the form of digital sound. Recent advances in theater sound now include the practical, highly directional stereo Q Sound, developed by Archer Communications of Toronto, Canada.

As a matter of symmetry, the dodecahedron has been applied to speakers as well, in U.S. Pat. No. 4,673,057 entitled "Geometric Transducer Arrangements" which describes the structure of a dodecahedral loudspeaker. If it is as appropriate for use as a sound-producing structure as the present invention is appropriate as a picture-producing structure, and Graf and Lang's dodecahedral recorder is used, then the dodecahedron can provide the key for the structure of the theater of the future.

The present invention can be applied to entertainment use, to provide a spectacular show. When such a large screen is used, however, different rules apply than those used for designing regular television and films, and great care should be taken to avoid actual unpleasant physical side effects in the audience. Subtlety rather than shock should be the standard, and extreme motion or rapid cuts should be avoided.

The present invention could also be applied to industrial simulations, surveillance and flight simulators. As with motion pictures in general, the uses for such a powerful method of creating and presenting the illusion of life are only limited by the talent of the user, and the capacity of the audience.

Thus, a method and apparatus for photography and projection of pentagonal images aligned to a dodecahedron, with an electro-optical lens and a masking processor, has been described.

I claim:

1. A method for photographing and projecting a field of view up to a complete sphere, including the steps of:
   centering a dodecahedron inside a concentric sphere representing a spherical field of view, and evert extension of the faces of said dodecadedron onto said sphere, thereby forming twelve spherical sections divided by pentagonal borders,
   photographing a composite image of a wide field of view up to a complete sphere, comprising a plurality of camera images and covering a total area of more than one section, by means of at least one camera, with each camera image being formed through a camera lens having an optical axis aligned to said dodecahedron, said camera lens also having a field of view sufficient to produce a camera image including at least one section's pentagonal border,
   cropping said camera image to said pentagonal border,
   aligning an array of projectors associated respectively with said camera images, each projector having a projector lens having an optical axis aligned to said dodecahedron,
   projecting said composite image by said array of projectors onto a concentric screen, thereby producing through a simultaneous display of adjacent camera images an apparently continuous composite picture of said wide field of view up to a complete sphere.

2. The method of claim 1, wherein said optical axis of said camera lens is centered on and perpendicular to a face of said dodecahedron, and said camera lens has a field of view sufficient to produce an image encompassing the pentagonal border of only that section corresponding to said face.

3. The method of claim 1, wherein said optical axis of said projector lens is centered on and perpendicular to a face of said dodecahedron, and said projector lens has a field of view sufficient to produce an image encompassing the pentagonal border of only that section corresponding to said face.

4. The method of claim 1, with the additional step of forming the camera and projector images through a video raster scan.

5. The method of claim 4, with the additional step of further cropping of the video raster scan at will, according to the application of blanking signals from a video matte source.

6. The method of claim 4, with the additional step of aligning an optical lens to the center of an edge of said dodecahedron, with an angle of view sufficient to encompass two sections, and further including distortion of said video raster scan through the application of drive voltages to create the effect of a lens with two optical centers, equal to the centers of said two sections.

7. The method of claim 6, with the additional step of projecting overlapping images from adjacent projection modules.

8. The method of claim 4, with the additional step of aligning an optical lens to a vertex of said dodecahedron, with an angle of view sufficient to encompass three sections, and further including distortion of said video raster scan through the application of drive voltages to create the effect of a lens with two optical centers, equal to the centers of said three sections.

9. The method of claim 8, with the additional step of projecting overlapping images from adjacent projection modules.

10. An apparatus for photographing and projecting a wide field of view up to a complete sphere, including:
a composite camera using an array of interchangable camera modules, each of said camera modules having a camera lens with an optical axis aligned to a dodecahedron, and a conical angle of view of at least 74 degrees, sufficient to encompass at least one pentagonal division corresponding to a face of said dodecahedron, as projected on a spherical field of view,
cropping means to limit the camera image of said pentagonal division from each camera module to a pentagonal shape equivalent to a contracted version of its respective face, so that each camera module's part of the field of view is equal to at least one pentagonal division, thereby photographing individual parts of a wide field of view up to a complete sphere,
a composite projector comprising an array of interchangable projection modules associated respectively with said camera modules, each of said projection modules having a projector lens with an optical axis aligned to said dodecahedron, said array of interchangable projection modules operable to display on a concentric surface its respective camera modules' images in a size and shape equal to said pentagonal divisions, thereby producing through a simultaneous display of adjacent camera images an apparently continuous picture over said wide field of view up to a complete sphere.

11. The apparatus of claim 10, wherein the alignment of said camera lens according to a dodecahedron consists of an optical axis centered on and perpendicular to a face of said dodecahedron, and said camera lens has a field of view sufficient to produce an image encompassing the pentagonal border of only that pentagonal division corresponding to said face.

12. The apparatus of claim 10, wherein the alignment of said projector lens according to said dodecahedron consists of an optical axis centered on and perpendicular to a face of said dodecahedron, and said projector lens has a field of view sufficient to produce an image encompassing the pentagonal border of only that pentagonal division corresponding to said face.

13. The apparatus of claim 10, wherein both camera modules and projection modules create an image using a video raster scan.

14. The apparatus of claim 13, wherein at least one Charge Coupled Device (CCD) image sensor is used for each camera module.

15. The apparatus of claim 13, wherein the signal representing the image from at least one camera module is recorded in a recording device.

16. The apparatus of claim 13, wherein a High Definition Television (HDTV) video standard with an aspect ratio of at least 9:16 is used.

17. The apparatus of claim 13, wherein each camera module includes a lens aligned to the center of an edge of a dodecahedron, with an angle of view of at least 140 degrees, sufficient to encompass two pentagonal divisions, and further including an electro-optical lens which creates distortion of the video image produced by the camera through the application of drive voltages to create the effect of a lens with two optical centers, equal to the centers of said two pentagonal divisions.

18. The apparatus of claim 13, wherein each camera module includes a camera lens aligned to a vertex of a dodecahedron, with an angle of view of at least 152 degrees, sufficient to encompass three pentagonal divisions, and further including an electro-optical lens which creates distortion of the video image produced by the camera lens through the application of drive voltages to create the effect of a lens with three optical centers, equal to the centers of said three pentagonal divisions.

19. The apparatus of claim 18, wherein the projector lens of each projection module has an optical axis aligned perpendicular to a vertex of a dodecahedron, and each projection module is operable to display the three side-by side pentagonal divisions adjacent to said vertex of a dodecahedron which are produced by a triple electro-optical lens.

20. The apparatus of claim 19, wherein the triple pentagonal images from adjacent camera modules are made to overlap during projection, thereby producing greatly increased resolution on the central screen, and providing multiple independently controllable layers to the projected image which may be manipulated for three-dimensional effects.

21. The apparatus of claim 13, further including a masking processor which further limits the portion of the camera image displayed by the projection module, with boundaries capable of being fluidly controlled through the application of blanking signals from a video matte source.

22. The apparatus of claim 21, wherein said masking processor enforces a boundary according to said pentagonal division between the images produced by adjacent projection modules.

23. The apparatus of claim 22, wherein said boundary according to said pentagonal division consists of a soft edge sufficient to disguise the border between adjacent images.

24. The apparatus of claim 13, wherein an audience views said simultaneous display from the interior of said concentric surface on a reflective front-projection screen.

25. The apparatus of claim 24, wherein each projection module includes a liquid crystal display (LCD) screen sufficient to reproduce a color video image from said projection module's respective camera module, a projector lamp for producing white light, a projection lens, and means to reproduce said color video image on said liquid crystal display, thereby coloring and regulating the intensity of said white light from said projection lamp, in a manner sufficient to project said color video image through said projection lens onto a front projection screen.

26. The apparatus of claim 24, wherein each projection module includes three light beam generators representing the red, green and blue component colors of video, and associated light valves for regulating the intensity of each light beam according to a signal representing the strength of its respective component color in a video image.

27. The apparatus of claim 26, wherein said light beam generators output laser beams.

28. The apparatus of claim 24, wherein the projector lens of each projection module has an optical axis aligned perpendicular to the center of an edge of said dodecahedron, and each projection module is operable to display the two side-by side pentagonal divisions adjacent to said edge produced by a dual electro-optical lens.

29. The apparatus of claim 28, wherein the dual pentagonal images from adjacent camera modules are made to overlap during projection, thereby increasing the apparent resolution and brightness of the projected image, and providing two independently controllable layers to the projected image which may be manipulated for three-dimensional effects.

30. The apparatus of claim 10, wherein said composite projector includes one projection module with a vertical optical axis.

31. The apparatus of claim 10, wherein an audience views said simultaneous display from the exterior of said concentric spherical surface through a translucent rear-projection screen.

32. An optical apparatus comprising:
a plurality of optical devices selected from the group consisting of cameras and projectors, each containing a lens mount and a lens having an an angle of view of at least 74 degrees attached to said lens mount, for creating a directed stream of light along an optical axis,
a plurality of interchangable modular support structures, each modular support structure comprising at least five sides equidistant from a central axis, with each side including at least one planar alignment surface at an average angle of approximately 58.28 degrees from a plane perpendicular to said central axis, and mounting means to enable said modular support structure to contain one of said optical devices in such a manner that said optical axis of said lens is made nearly congruent to said central axis,
attachment means for locking adjacent modular support structures together along contiguous planar alignment surfaces, so that the optical axes of any optical devices contained within said adjacent modular support structures will be aligned to meet near a central point, with each optical axis also made perpendicular to the center of one face of a pentagonal dodecahedron approximately concentric to said central point.

33. An optical apparatus comprising:
a plurality of optical devices selected from the group consisting of cameras and projectors, each containing a lens mount and a lens having an an angle of view of at least 140 degrees attached to said lens mount, for creating a directed stream of light along an optical axis,
a plurality of modular support structures, each comprising at least three sides around a main axis, and mounting means to enable said modular support structure to contain one of said optical devices in such a manner that said main axis,
attachment means for locking adjacent modular support structures together side to side, so that the optical axes of any optical devices contained within said adjacent modular support structures will be aligned to meet near a central point, with each optical axis also made perpendicular to the center of one edge of a pentagonal dodecahedron approximately concentric to said central point.

34. An optical apparatus comprising:
a plurality of optical devices selected from the group consisting of cameras and projectors, each containing a lens mount and a lens having an an angle of view of at least 152 degrees attached to said lens mount, for creating a directed stream of light along an optical axis,
a plurality of modular support structures, each comprising at least three sides around a main axis, and mounting means to enable said modular support structure to contain one of said optical devices in such a manner that said optical axis of said lens is made nearly congruent to said main axis,
attachment means for locking adjacent modular support structures together side to side, so that the optical axes of any optical devices contained within said adjacent modular support structures will be aligned to meet near a central point, with each optical axis also made perpendicular to one vertex of a pentagonal dodecahedron approximately concentric to said central point.

* * * * *

UNITED STATES PATENT AND TRADEMARK OFFICE
CERTIFICATE OF CORRECTION

PATENT NO. : 5,023,725

DATED : June 11, 1991

INVENTOR(S) : David McCutchen

It is certified that error appears in the above-identified patent and that said Letters Patent is hereby corrected as shown below:

The title page should be deleted to appear as per attached title page.

United States Patent [19]
McCutchen

[11] Patent Number: 5,023,725
[45] Date of Patent: Jun. 11, 1991

[54] METHOD AND APPARATUS FOR DODECAHEDRAL IMAGING SYSTEM

[76] Inventor: David McCutchen, 931 N. Gardner St., W. Hollywood, Calif. 90046

[21] Appl. No.: 425,406

[22] Filed: Oct. 23, 1989

[51] Int. Cl.$^5$ .................. H04N 5/74; H04N 7/00; H04N 9/31; H04N 7/18
[52] U.S. Cl. .................. 358/231; 358/87; 358/60; 358/93; 350/502; 352/70; 354/94
[58] Field of Search .................. 358/60, 231, 87, 50, 358/93, 104; 350/502, 124, 125; 352/69, 70; 354/103, 110, 113, 119, 94; 353/30, 28

[56] References Cited

U.S. PATENT DOCUMENTS

| | | | |
|---|---|---|---|
| 3,209,073 | 9/1965 | Falbel | 358/87 |
| 3,687,530 | 8/1972 | Watanuki | 352/71 |
| 3,698,803 | 10/1972 | Watanuki | 352/69 |
| 3,832,565 | 8/1974 | Graf | 250/566 |
| 4,100,571 | 7/1978 | Dykes | 358/87 |
| 4,214,821 | 7/1980 | Termes | 352/70 |
| 4,656,506 | 4/1987 | Ritchey | 358/60 |
| 4,673,057 | 6/1987 | Glassco | 181/144 |
| 4,772,942 | 9/1988 | Tuck | 358/87 |
| 4,796,961 | 1/1989 | Yamada et al. | 350/6.8 |
| 4,798,448 | 1/1989 | Van Raalte | 350/345 |

OTHER PUBLICATIONS

Daily Variety: "Single-Camera, 360-Film . . . ", 12/26/89, p. 3.
Sidney Ray: "The Lens and All Its Jobs", 1977, 64–69, 74–7, 98–103.
Cox: "Photographic Optics", 1974, pp. 485–497, 514–533.
Video (Magazine): Sep. '89 Issue—See Woodcock, p. 18, Slovick, pp. 64–68, Forbis, pp. 70–73.
Panasonic (Brochures) on WU-CD2, GP-12 Cameras and Lenses.
Sony (brochure) on XC-711 and XC-007 CCD Cameras.
Computer Pictures Magazine, 9/89, p. 56 ad for Nikon Hr-1500c.
Re:Facts (brochure) on Relay Single Fiber HD Transmission System.
SMPTE Journal, 9/89, "Transmission of HDTV . . . " Natarajan et al., 651–657.
Laser Creations (brochure) on LVP Laser Video Projector, 9/21/89.
Hitachi (brochure) on C70-2010R Multiscan HD Projector.
Thorn EMI (brochure) on CID Projection Lamp.
Pugh, "Polyhedra, A Visual Approach", 1976, pp. 7–10, 12, 14, 26, 57–60, 84–102.
Wenninger, "Spherical Models", 1979, pp. 9–21, 26–33, 37, 41, 126–131, 43–53, 58–61, 65–66.
Dana's Textbook of Minerology, 1946 ed. pp. 70–71, 74–85.
Photographic Stills (3) from "Flat Out" by David McCutchen.

*Primary Examiner*—John K. Peng

[57] ABSTRACT

A dodecahedral environmental photography and projection system based on a pentagonal format is disclosed, designed for a modular compound camera and projector system aligned according to the dodecahedron, for the photography and projection of apparently continuous images across the interior surface of a dome or spherical theater. The use of a compound system provides better resolution that a single-camera system, and the use of a pentagonal picture as a standard shape allows complete coverage of a spherical surface, and greater use of the available lens image than existing rectangular formats. By the addition of camera and projection modules, this system enables photography and projection up to a total spherical field of view, and practical application of video technology to a dome theater. A masking processor is also provided to control the shape of the projected video image, enabling projection of compound images of variable overall shape and size. An electro-optical lens is also described, sufficient to produce the effect of a lens with two or three optical centers, so that one lens can cover more than one view. With a dual-center lens, the number of camera modules required is thereby halved, or if the number of camera modules remains the same and their dual views are made to overlap, the effective resolution of the system is thereby doubled.

34 Claims, 18 Drawing Sheets

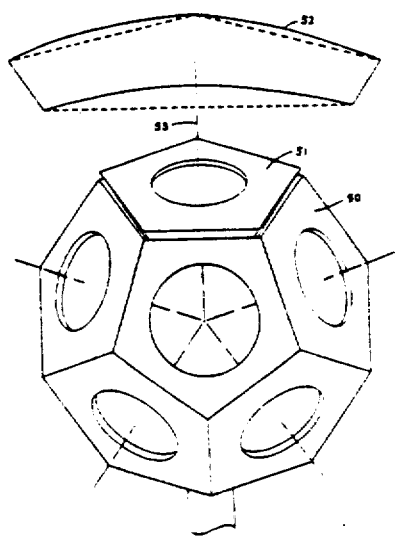

UNITED STATES PATENT AND TRADEMARK OFFICE
CERTIFICATE OF CORRECTION

PATENT NO. : 5,023,725                     Page 3 of 4

DATED      : June 11, 1991

INVENTOR(S) : David McCutchen

It is certified that error appears in the above-identified patent and that said Letters Patent is hereby corrected as shown below:

On the cover page, in the Abstract, section [57], at the end of line 8, delete the hyphen '-' after the word 'system,' thereby moving the comma following that word to the end of that line.

On Col. 7, line 30, delete the extra space between the number '52.' and the word 'Pentagonal'.
On Col. 7, line 37, delete the extra space between the number '57a.' and the word 'Angle'.
On Col. 7, line 45, delete the extra space between the number '63.' and the word 'Negative'.
On Col. 7, line 46, add the minus sign -- - -- before the number '26.565054'.
On Col. 11, line 42, add the seconds sign --"-- after the number '41.4564'.
On Col. 11, line 48, add --26°,33',54.1944" (26.565054°)-- after the words 'above the horizon line' and before the period.
On Col. 11, line 50, add --°, 33',54.1944"-- after the number '-26'.

UNITED STATES PATENT AND TRADEMARK OFFICE
CERTIFICATE OF CORRECTION

PATENT NO. : 5,023,725

DATED : June 11, 1991

INVENTOR(S) : David McCutchen

It is certified that error appears in the above-identified patent and that said Letters Patent is hereby corrected as shown below:

On Col. 15, line 44, change 'ligh-' to --light- --.
On Col. 18, line 26, change the numbers '1' and '904' from bold face to plain face.
On Col. 20, line 1, change the word 'not' to italics from plain face.
On Col. 26, line 7, change '116.565054''' to --116.565054°--.
On Col. 26, line 10, change '20.905151'' to --20.905151°--.
On Col. 26, line 11, change '37.377376'' to --37.377376°--.
On Col. 26, line 13, change '31.717473'' to --31.717473°--.

Signed and Sealed this

Tenth Day of November, 1992

*Attest:*

DOUGLAS B. COMER

*Attesting Officer*     *Acting Commissioner of Patents and Trademarks*